(12) United States Patent
Isono

(10) Patent No.: US 11,441,658 B2
(45) Date of Patent: Sep. 13, 2022

(54) DIFFERENTIAL ASSEMBLY

(71) Applicant: TOYOTA JIDOSHA KABUSHIKI KAISHA, Toyota (JP)

(72) Inventor: Hiroshi Isono, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/507,241

(22) Filed: Oct. 21, 2021

(65) Prior Publication Data

US 2022/0145974 A1    May 12, 2022

(30) Foreign Application Priority Data

Nov. 11, 2020  (JP) .............................. JP2020-188274

(51) Int. Cl.
| | |
|---|---|
| *F16H 48/10* | (2012.01) |
| *F16H 1/32* | (2006.01) |
| *F16H 48/36* | (2012.01) |
| *F16H 48/22* | (2006.01) |
| *F16H 48/38* | (2012.01) |

(Continued)

(52) U.S. Cl.
CPC ......... *F16H 48/36* (2013.01); *F16H 37/0806* (2013.01); *F16H 48/10* (2013.01); *F16H 48/22* (2013.01); *F16H 48/38* (2013.01); *F16H 2001/325* (2013.01); *F16H 2001/327* (2013.01); *F16H 2048/364* (2013.01); *F16H 2057/085* (2013.01); *F16H 2702/02* (2013.01)

(58) Field of Classification Search
CPC ...... F16H 48/36; F16H 37/0806; F16H 48/10; F16H 48/22; F16H 48/38; F16H 2048/364; F16H 2057/085; F16H 2702/02; F16H 1/32; F16H 2001/325; F16H 2001/327
USPC ....................................................... 475/174
See application file for complete search history.

(56) References Cited

U.S. PATENT DOCUMENTS

| | | | | |
|---|---|---|---|---|
| 1,405,986 A | * | 2/1922 | Elbertz .................... | F16H 48/10 475/174 |
| 1,483,606 A | * | 2/1924 | Krohn .................... | F16H 48/10 475/174 |

(Continued)

FOREIGN PATENT DOCUMENTS

| | | | |
|---|---|---|---|
| CN | 208024806 U | * | 10/2018 |
| JP | 2005-351471 A | | 12/2005 |
| JP | 6122119 B2 | | 4/2017 |

*Primary Examiner* — Sherry L Estremsky
(74) *Attorney, Agent, or Firm* — Sughrue Mion, PLLC

(57) ABSTRACT

A downsized differential assembly having a simple structure, which can be mounted easily on automobiles. The differential assembly comprises: a first gear as an internal gear; a second gear as an external gear; a first eccentric gear as an external gear meshed with the first gear; a second eccentric gear as an internal gear meshed with the second gear; a supporting member supporting the first eccentric gear and the second eccentric gear; a first motion translating mechanism translating revolving motion of the first eccentric gear into rotary motion of the first rotary shaft; and a second motion translating mechanism translating revolving motion of the second eccentric gear into rotary motion of the second rotary shaft. Gear ratios between the first gear and the first eccentric gear and between the second gear and the second eccentric gear are different, and the first rotary shaft and the second rotary shaft are rotated in opposite directions.

12 Claims, 16 Drawing Sheets

(51) Int. Cl.
*F16H 37/08* (2006.01)
*F16H 57/08* (2006.01)

(56) References Cited

U.S. PATENT DOCUMENTS

| | | | | |
|---|---|---|---|---|
| 4,665,769 | A * | 5/1987 | Parsons | F16H 48/10 |
| | | | | 475/174 |
| 7,037,231 | B2 * | 5/2006 | Showalter | B60K 17/3462 |
| | | | | 475/222 |
| 10,359,099 | B1 * | 7/2019 | Gardner | F16H 1/32 |
| 2016/0153537 | A1 | 6/2016 | Kubo et al. | |
| 2022/0082163 | A1 * | 3/2022 | Isono | F16H 48/36 |

* cited by examiner

DIFFERENTIAL ASSEMBLY

CROSS REFERENCE TO RELATED APPLICATION

The present disclosure claims the benefit of Japanese Patent Application No. 2020-188274 filed on Nov. 11, 2020, with the Japanese Patent Office, the disclosures of which are incorporated herein by reference in its entirety.

BACKGROUND

Field of the Disclosure

Embodiments of the present disclosure relate to the art of a differential assembly that allows two rotary shafts arranged coaxially to rotate in a differential manner.

Discussion of the Related Art

JP-B2-6122119 describes one example of a drive gear unit as a torque vectoring device mounted on a vehicle. The drive gear unit taught by JP-B2-6122119 comprises a differential gear unit that distributes output torque of a prime mover to right and left wheels, and a control (or differential) motor that controls a distribution ratio of the torque distributed through the differential gear unit to the right and left wheels. According to the teachings of JP-B2-6122119, the drive gear unit comprises two sets of planetary gear units arranged coaxially. In the drive gear unit, sun gears of the planetary gear units are connected to each other through a connection shaft to serve as an input element, each carrier of the planetary gear units individually serves as an output element, and each ring gear of the planetary gear units individually serves as a reaction element. An intermediate gear is fitted onto an intermediate portion of the connection shaft, and an input gear to which torque is delivered from a prime mover is mated with the intermediate gear. Each of the carriers is individually connected to the drive wheels through a driveshaft. The ring gears are connected to each other through a reversing mechanism including a first gear and a second gear, and the control motor is connected to one of the ring gears. Specifically, the first gear comprises a first pinion engaged with outer teeth of one of the ring gears, a shaft member, and a second pinion, and the first pinion and the second pinion are mounted on each end of the shaft member. Likewise, the second gear includes a first pinion engaged with outer teeth of the other one of the ring gears, a shaft member, and a second pinion, and the first pinion and the second pinion are mounted on each end of the shaft member. The second pinion of the first gear is engaged with the second pinion of the second gear. Thus, the reversing mechanism transmits torque delivered to one of the ring gears from the control motor to the other one of ring gears while reversing. In the drive gear unit taught by JP-B2-6122119, a distribution ratio of the torque delivered to the right wheel and the left wheel can be changed by controlling a torque of the control motor.

In the drive gear unit shown in FIG. 19 of JP-B2-6122119, the ring gears are connected to each other through a connection member to serve as the input element, the carriers serve as the output element, and the sun gears serve as the reaction element. Specifically, the connection member includes the first pinion engaged with the outer teeth of one of the ring gears, the second pinion engaged with the outer teeth of the other one of the ring gears, and the shaft member, and the first pinion and the second pinion are mounted on each end of the shaft member. A drive gear to which torque is delivered from a prime mover is engaged with the outer teeth of the other one of the ring gears, and each of the carriers is individually connected to the wheels through the driveshaft. In the drive gear unit shown in FIG. 19 of JP-B2-6122119, the sun gears are connected to each other through a reversing motor including a motor and a gear unit. In the reversing motor, one end of a rotor shaft serves as a first output shaft, and a pinion is mounted on the other end of the rotor shaft. A first counter gear is mounted on one end of a counter shaft to be engaged with the pinion, and a second counter gear is mounted on the other end of the counter shaft to be engaged with inner teeth of a rotary member formed on a second output shaft extending coaxially with the first output shaft. The first output shaft is connected to one of the sun gears and the second output shaft is connected to the other one of the sun gears so that the torque delivered to one of the sun gears is delivered to the other one of the sun gears through the reversing motor while being reversed. That is, the reversing motor serves not only as the control motor but also as a reversing mechanism.

JP-A-2005-351471 describes differential gear unit in which output elements are rotated in a differential manner by two sets of planetary gear units. In the differential gear unit taught by JP-A-2005-351471, the planetary gear units are combined with each other to serve as a complex planetary gear unit, and in the complex planetary gear unit, carriers of the planetary gear units are connected to each other. A rotation of a ring gear of one of the planetary gear units can be stopped by a brake mechanism, and a rotation of a ring gear of the other one of the planetary gear units is controlled by a differential motor connected thereto. A sun gear of one of the planetary gear units is connected to one of driveshafts, and a sun gear of the other one of the planetary gear units is connected to the other one of driveshafts though a so-called "open differential".

In order to fit the drive gear unit taught by JP-B2-6122119 into automobiles, it is preferable to downsize the drive gear unit as much as possible. However, in the drive gear unit shown in FIG. 1 of JP-B2-6122119, the reversing mechanism and the control motor are situated radially outer side of the ring gears thereby increasing the size of the drive gear unit in the radial direction. In the drive gear unit of this kind, for example, a torque of the control motor may be increased to downsize the control motor by arranging a speed reducing mechanism of large speed reducing ratio between the control motor and the ring gear. In this case, however, the size of the drive gear unit may be increased by the speed reducing mechanism.

On the other hand, in the drive gear unit shown in FIG. 19 of JP-B2-6122119, the reversing motor is disposed between the sun gears, and hence the drive gear unit may be downsized in the radial direction but it is not easy. That is, the reversing motor has a complicated dual-axis structure in which the counter shaft extends parallel to the first output shaft and the second output shaft. Therefore, if the additional speed reducing mechanism is arranged in the drive gear unit to downsize the reversing motor, the structure of the reversing motor becomes more complicated and this makes the reversing motor difficult to be fitted into automobiles.

SUMMARY

Aspects of embodiments of the present disclosure have been conceived noting the foregoing technical problems, and it is therefore an object of embodiments of the present disclosure to provide a downsized differential assembly having a simple structure, which can be mounted easily on automobiles.

An exemplary embodiment of the present disclosure relates to differential assembly, comprising: a first rotary shaft and a second rotary shaft extending coaxially along a common rotational center axis while being allowed to rotate relatively to each other; and a differential mechanism that allows the first rotary shaft and the second rotary shaft to rotate at different speeds. In order to achieve the above-explained objective, according to the exemplary embodiment of the present disclosure, the differential mechanism comprises: a first gear that is arranged around the rotational center axis to be rotated relatively to the first rotary shaft; a second gear that is arranged around the rotational center axis to be rotated relatively to the second rotary shaft and integrally with the first gear; a first eccentric gear that is arranged around a first eccentric axis offset from the rotational center axis while being meshed with the first gear, in such a manner as to rotate around the first eccentric axis and revolve around the rotational center axis; a second eccentric gear that is arranged around a second eccentric axis offset from the rotational center axis while being meshed with the second gear, in such a manner as to rotate around the second eccentric axis and revolve around the rotational center axis; a supporting member that is arranged around the rotational center axis to support the first eccentric gear and the second eccentric gear in a revolvable manner around the rotational center axis, while being allowed to rotate relatively to the first rotary shaft and the second rotary shaft; a first motion translating mechanism that translates a revolving motion of the first eccentric gear into a rotary motion of the first rotary shaft, and translates the rotary motion of the first rotary shaft into the revolving motion of the first eccentric gear; and a second motion translating mechanism that translates a revolving motion of the second eccentric gear into a rotary motion of the second rotary shaft, and translates the rotary motion of the second rotary shaft into the revolving motion of the second eccentric gear. The first gear is an internal gear, and the first eccentric gear is an external gear that is meshed with the first gear from radially inner side. On the other hand, the second gear is an external gear, and the second eccentric gear is an internal gear that is meshed with the second gear contacted thereto from radially inner side. A gear ratio between the first gear and the first eccentric gear and a gear ratio between the second gear and the second eccentric gear are set to different values. In addition, the first rotary shaft and the second rotary shaft are rotated in opposite directions when rotated at different speeds.

In a non-limiting embodiment, the differential assembly may further comprise a drive input member to which a drive torque is delivered from a prime mover. In the differential assembly, the drive input member may be rotated integrally with the first gear and the second gear, and the drive input member may distribute the torque of the prime mover to the first rotary shaft and the second rotary shaft.

In a non-limiting embodiment, the differential assembly may further comprise: a control motor that generates a control torque; and another supporting member supporting one of the first eccentric gear and the second eccentric gear in a revolvable manner, to which the control torque is delivered from the control motor. In the differential assembly, the another supporting member may transmit the control torque to the one of the first eccentric gear and the second eccentric gear such that the one of the first eccentric gear and the second eccentric gear revolves around the rotational center axis. The first eccentric gear and the second eccentric gear may be rotated in the opposite directions by applying the control torque to the another supporting member. A distribution ratio of the drive torque to the first rotary shaft and the second rotary shaft may be changed by controlling the control torque generated by the control motor.

In a non-limiting embodiment, the differential assembly may further comprise: a speed increasing planetary gear set comprising a speed increasing sun gear, a speed increasing ring gear, and a speed increasing carrier; and a speed reducing planetary gear set comprising a reduction sun gear, a reduction ring gear, and a reduction carrier. In the differential assembly, the speed increasing planetary gear set and the speed reducing planetary gear set may be formed around the rotational center axis. In the speed increasing planetary gear set, the speed increasing sun gear may be fixed and not allowed to rotate, the speed increasing carrier may be rotated integrally with the drive input member, and the speed increasing ring gear may be rotated at a higher speed than a rotational speed of the speed increasing carrier. In the speed reducing planetary gear set, the reduction ring gear may be connected to the speed increasing ring gear to be rotated integrally with the speed increasing ring gear, the reduction carrier may be rotated integrally with the another supporting member at a lower speed than a rotational speed of the reduction ring gear, and the reduction sun gear may be rotated integrally with an output shaft of the control motor, and relatively to the drive input member when the first rotary shaft and the second rotary shaft are rotated passively at a same speed in a same direction together with the drive input member.

In a non-limiting embodiment, the differential assembly may be mounted on a vehicle having a right wheel and a left wheel together with the prime mover and the control motor. In this case, the first rotary shaft may transmit a torque between one of the wheels and the first eccentric gear, the second rotary shaft may transmit a torque between the other one of the wheels and the second eccentric gear, and the first rotary shaft and the second rotary shaft may extend coaxially in a width direction of the vehicle.

In a non-limiting embodiment, the differential assembly may also be mounted on a vehicle having a front wheel and a rear wheel together with the prime mover and the control motor. In this case, the first rotary shaft may transmit a torque between one of the wheels and the first eccentric gear, the second rotary shaft may transmit a torque between the other one of the wheels and the second eccentric gear, and the first rotary shaft and the second rotary shaft may extend coaxially in a longitudinal direction of the vehicle.

In a non-limiting embodiment, the differential assembly may further comprise an engagement device that is selectively engaged to integrally rotate the drive input member and the second eccentric gear. In the differential assembly, the differential mechanism may restrict a differential rotation between the first rotary shaft and the second rotary shaft by engaging the engagement device to rotate the drive input member and the second eccentric gear integrally.

In a non-limiting embodiment, the first motion translating mechanism may comprise: a first eccentric plate in which the first eccentric gear is formed on its outer circumferential surface; a first plate that is mounted on the first rotary shaft while being opposed to the first eccentric plate in an axial direction to be rotated integrally with the first rotary shaft; a plurality of first reaction holes formed on the first eccentric plate along a pitch circle drawn around the first eccentric axis at regular intervals; and a plurality of first reaction pins attached to the first plate along a pitch circle drawn around the rotational center axis at regular intervals to be inserted loosely into the first reaction holes. The first motion translating mechanism thus structured may translate a revolving motion of the first eccentric plate around the rotational center axis into a rotary motion of the first plate around the rotational center axis, and translate the rotary motion of the first plate around the rotational center axis into the revolving motion of the first eccentric plate around the rotational center axis. On the other hand, the second motion translating mechanism may comprise: a second eccentric plate formed integrally with a cylindrical portion in which the second eccentric gear is formed on an inner circumferential surface; a second plate that is mounted on the second rotary shaft while being opposed to the second eccentric plate in the axial direction to be rotated integrally with the second rotary shaft; a plurality of second reaction holes formed on the second eccentric plate along a pitch circle drawn around the second eccentric axis at regular intervals; and a plurality of second reaction pins attached to the second plate along a pitch circle drawn around the rotational center axis at regular intervals to be inserted loosely into the second reaction holes. The second motion translating mechanism thus structured may translate a revolving motion of the second eccentric plate around the rotational center axis into a rotary motion of the second plate around the rotational center axis, and translate the rotary motion of the second plate around the rotational center axis into the revolving motion of the second eccentric plate around the rotational center axis.

In a non-limiting embodiment, the differential assembly may further comprise a dual teeth eccentric member formed around the rotational center axis, that has a hollow portion formed around the first eccentric axis. In the differential assembly, the first gear may be formed on an inner circumferential surface of the hollow portion, the second gear may be formed on an outer circumferential surface of the dual teeth eccentric member, and the first eccentric axis and the second eccentric axis may be offset from each other. In addition, the first eccentric plate, the second eccentric plate, and the dual teeth eccentric member may be overlapped to one another in the axial direction.

In a non-limiting embodiment, a cycloid gear may be adopted as the first gear, the first eccentric gear, the second gear, and the second eccentric gear. In addition, the number of teeth $z_1$ of the first gear, the number of teeth $z_2$ of the first eccentric gear, the number of teeth $z_3$ of the second gear, and the number of teeth $z_4$ of the second eccentric gear may be set such that all of the following relational expressions are satisfied:

$$z_1 = z_3;$$

$$z_2 = z_1 - 1; \text{ and}$$

$$z_4 = z_1 + 1.$$

In a non-limiting embodiment, the first motion translating mechanism may comprise: a first output eccentric gear as an internal gear that is rotated integrally with the first eccentric gear around the first eccentric axis; and a first output gear as an external gear that is rotated integrally with the first rotary shaft while being meshed with the first output eccentric gear from radially inner side. The first motion translating mechanism thus structured may translate a revolving motion of a unit of the first eccentric gear and the first output eccentric gear around the rotational center axis into a rotary motion of the first output gear around the rotational center axis, and translate a rotary motion of the first output gear around the rotational center axis into a revolving motion of the unit of the first eccentric gear and the first output eccentric gear around the rotational center axis. On the other hand, the second motion translating mechanism may comprise: a second output eccentric gear as an external gear that is rotated integrally with the second eccentric gear around the second eccentric axis; and a second output gear as an internal gear that is rotated integrally with the second rotary shaft while being meshed with the second output eccentric gear contacted thereto from radially inner side. The second motion translating mechanism thus structured may translate a revolving motion of a unit of the second eccentric gear and the second output eccentric gear around the rotational center axis into a rotary motion of the second output gear around the rotational center axis, and translate a rotary motion of the second output gear around the rotational center axis into a revolving motion of the unit of the second eccentric gear and the second output eccentric gear around the rotational center axis.

In a non-limiting embodiment, a cycloid gear may be adopted as the first gear, the first eccentric gear, the first output gear, the first output eccentric gear, the second gear, the second eccentric gear, the second output gear, and the second output eccentric gear. In addition, the number of teeth $z_{11}$ of the first gear, the number of teeth $z_{12}$ of the first eccentric gear, the number of teeth $z_{13}$ of the first output gear, the number of teeth $z_{14}$ of the first output eccentric gear, the number of teeth $z_{21}$ of the second gear, the number of teeth $z_{22}$ of the second eccentric gear, the number of teeth $z_{23}$ of the second output gear, and the number of teeth $z_{24}$ of the second output eccentric gear are set such that all of the following relational expressions are satisfied:

$$z_{11} = z_{14};$$

$$z_{12} = z_{13} = z_{11} - 1;$$

$$z_{21} = z_{24} = z_{11} - 3; \text{ and}$$

$$z_{22} = z_{23} = z_{21} + 1.$$

Thus, according to the exemplary embodiment of the present disclosure, the differential assembly comprises: the first eccentric gear and the second eccentric gear individually engaged with the first gear and the second gear; the supporting member that supports the first eccentric gear and the second eccentric gear in a revolvable manner around the rotational center axis; the first motion translating mechanism that translates motions between the first eccentric gear and the first rotary shaft; and the second motion translating mechanism that translates motions between the second rotary shaft and the second eccentric gear. Those four gears and the supporting member serve as main constituent of the differential assembly. Specifically, the first gear as an internal gear is meshed with the first eccentric gear as an external gear, and the second gear as an external gear is meshed with the second eccentric gear as an internal gear. That is, the differential assembly comprises two sets of internal contact type planetary gear sets commonly using the supporting member. Such internal contact type planetary gear set does not have a planetary pinion, and therefore, a structure of the internal contact type planetary gear set is simpler than that of a conventional planetary gear set in which a planetary pinion is interposed between a sun gear and a ring gear.

In the differential assembly thus structured, the first gear ratio between the first gear and the first eccentric gear, and the second gear ratio between the second gear and the second eccentric gear are set to different values. Therefore, when the first eccentric gear connected to the first rotary shaft and the second eccentric gear connected to the second rotary shaft are rotated at a same speed, torques are applied to an engagement site between the first gear and the first eccentric gear, and to an engagement site between the second gear and the second eccentric gear in opposite directions thereby causing interference between those engagement sites. Consequently, the differential assembly is substantially brought into engagement to rotate integrally so that the first eccentric gear and the second eccentric gear are rotated integrally without rotating relatively to each other. By contrast, when the first eccentric gear and the second eccentric gear are rotated at different speeds, the differential assembly will not be brought into engagement due to interference between the above-mentioned engagement sites. In this case, the differential assembly transmits the torque in accordance with the first gear ratio and the second gear ratio. Consequently, the first eccentric gear and the second eccentric gear are rotated in directions to reverse a rotational direction of one of the first rotary shaft and the second rotary shaft. According to the exemplary embodiment of the present disclosure, therefore, the differential assembly may serve as a compact differential unit having a simple structure.

As described, according to the exemplary embodiment of the present disclosure, the differential assembly is provided with the drive input member so that the drive torque of the prime mover is distributed to the first eccentric gear and the second eccentric gear. The drive torque is further delivered from the first eccentric gear to the first rotary shaft through the first motion translating mechanism, and from the second eccentric gear to the second rotary shaft through the second motion translating mechanism. Thus, in the differential assembly, the drive torque delivered from the prime mover is distributed to the first rotary shaft and the second rotary shaft, and a speed difference between the first rotary shaft and the second rotary shaft is absorbed by the differential assembly. For this reason, the differential assembly may serve as a compact open differential unit having a simple structure.

The differential assembly according to the exemplary embodiment of the present disclosure may be combined with the control motor to serve as a torque vectoring device. In the differential assembly, the control torque of the control motor is distributed from another supporting member to the first rotary shaft through the first eccentric gear and to the second rotary shat through the second eccentric gear. Consequently, the first eccentric gear and the second eccentric gear are rotated in opposite directions. That is, a distribution ratio of the drive torque to the first rotary shaft connected to one of drive wheels and the second rotary shaft connected to the other one of drive wheels can be controlled by changing the control torque generated by the control motor. As described, the differential assembly comprises two sets of internal contact type planetary gear sets so that the control torque of the control motor may be distributed to the first eccentric gear and the second eccentric gear while being multiplied by relatively large factors. According to the exemplary embodiment of the present disclosure, therefore, the control motor may be downsized, and the differential assembly may serve as a compact differential unit having a simple structure.

In order not to rotate the control motor passively, the differential assembly according to the exemplary embodiment of the present disclosure is provided with the speed increasing planetary gear set and the speed reducing planetary gear set. In the differential assembly according to the exemplary embodiment of the present disclosure, the first gear, the second gear, and the supporting member are rotated integrally when the first rotary shaft and the second rotary shaft the rotate in the same direction at a same speed. Consequently, the speed increasing carrier of the speed increasing planetary gear set and the reduction carrier of the speed reducing planetary gear set are rotated in the same direction at a same speed. In this situation, the speed increasing planetary gear set in which the speed increasing sun gear is fixed serves as a speed increasing mechanism to increase a rotational speed of the speed increasing ring gear higher than a rotational speed of the speed increasing carrier. On the other hand, the speed reducing planetary gear set serves as a speed reducing mechanism to reduce a rotational speed of the reduction carrier lower than a rotational speed of the reduction ring gear. In this situation, since the speed increasing ring gear is connected to the reduction ring gear, the speed increasing ring gear and the reduction ring gear are also rotated at a same speed. Consequently, an absolute value of the speed increasing ratio of the speed increasing planetary gear set and an absolute value of the speed reducing ratio of the speed reducing planetary gear set are equalized to each other. In this situation, since a rotational speed of the speed increasing sun gear is zero, the rotational speed of the reduction sun gear is reduced to substantially zero that is lower than the rotational speed of the reduction ring gear or the reduction carrier, in accordance with the gear ratio of the speed reducing planetary gear set. That is, since the gear ratio of the speed increasing planetary gear set and the gear ratio of the speed reducing planetary gear set are equal to each other, the rotational speed of the reduction sun gear is reduced to substantially zero. Therefore, when the first rotary shaft and the second rotary shaft rotate in the same direction at the same speed so that the first gear, the second gear, and the supporting member are rotated integrally and passively, a rotational speed of the output shaft of the control motor connected to the reduction sun gear may be maintained to zero. For this reason, the control motor can be prevented from being rotated passively. By thus preventing the passive rotation of the control motor, a power transmission efficiency of the differential assembly and an energy efficiency of the vehicle can be improved.

For example, in the vehicle, the first rotary shaft may be connected to one of the right and left wheels, and the second rotary shaft may be connected to the other one of the right and left wheels. According to the exemplary embodiment of the present disclosure, therefore, the differential assembly may serve as a differential mechanism of the vehicle. In addition, since the differential assembly according to the exemplary embodiment of the present disclosure is provided with the control motor, the differential assembly may also serve as a torque vectoring device that is easily fitted into the vehicle.

Instead, the differential assembly according to the exemplary embodiment of the present disclosure may also be mounted on a four-wheel drive layout vehicle. In this case, the first rotary shaft may also be connected to one of the front and rear wheels, and the second rotary shaft may be connected to the other one of the front and rear wheels to serve as a center differential mechanism. In this case, the differential assembly may also be combined with the control motor to serve as a torque vectoring device that is easily fitted into the vehicle.

In the differential assembly, an engagement device may be employed instead of or in addition to the control motor. In this case, in order to restrict a differential rotation between the first rotary shaft and the second rotary shaft, the engagement device is engaged to engage the drive input member with the second eccentric gear. For example, a frictional clutch and a dog clutch may be adopted as the engagement device. In this case, the differential assembly has a differential lock function, and hence a driving performance and a control stability of the vehicle on which the differential assembly is mounted can be improved.

In the first motion translating mechanism, the first reaction pins attached to the first plate mounted on the first rotary shaft are inserted loosely into the first reaction holes formed on the first eccentric plate. Specifically, in order to allow the first eccentric plate to revolve smoothly without causing an interference between the first reaction pins and the first reaction holes, an inner diameter of each of the first reaction holes is individually larger than an outer diameter of each of the first reaction pins. To this end, for example, a difference between the inner diameter of the first reaction hole and the outer diameter of the first reaction pin is set larger than the amount of eccentricity of the first eccentric axis with respect to the rotational center axis. Specifically, when the first eccentric plate revolves around the rotational center axis, the first motion translating mechanism allows the first plate to rotate around the rotational center axis, while absorbing the eccentric displacement of the first eccentric plate by a space maintained between the first reaction hole and the first reaction pin. Likewise, when the first plate rotates around the rotational center axis, the first motion translating mechanism allows the first eccentric plate to revolve around the rotational center axis, while absorbing the eccentric displacement of the first eccentric plate by the space maintained between the first reaction hole and the first reaction pin. That is, the first motion translating mechanism translates the revolving motion of the first eccentric gear into the rotary motion of the first rotary shaft, and translates the rotary motion of the first rotary shaft into the revolving motion of the first eccentric gear.

Likewise, in the second motion translating mechanism, the second reaction pins attached to the second plate mounted on the second rotary shaft are inserted loosely into the second reaction holes formed on the second eccentric plate. Specifically, in order to allow the second eccentric plate to revolve smoothly without causing an interference between the second reaction pins and the second reaction holes, an inner diameter of each of the second reaction holes is individually larger than an outer diameter of each of the second reaction pins. To this end, for example, a difference between the inner diameter of the second reaction hole and the outer diameter of the second reaction pin is set larger than the amount of eccentricity of the second eccentric axis with respect to the rotational center axis. Specifically, when the second eccentric plate revolves around the rotational center axis, the second motion translating mechanism allows the second plate to rotate around the rotational center axis, while absorbing the eccentric displacement of the second eccentric plate by a space maintained between the second reaction hole and the second reaction pin. Likewise, when the second plate rotates around the rotational center axis, the second motion translating mechanism allows the second eccentric plate to revolve around the rotational center axis, while absorbing the eccentric displacement of the second eccentric plate by the space maintained between the second reaction hole and the second reaction pin. That is, the second motion translating mechanism translates the revolving motion of the second eccentric gear into the rotary motion of the second rotary shaft, and translates the rotary motion of the second rotary shaft into the revolving motion of the second eccentric gear.

Thus, only the first eccentric gear and the second eccentric gear are employed to serve as the first motion translating mechanism and the second motion translating mechanism. That is, a gear mechanism of the differential assembly is formed only of the first gear, the first eccentric gear, the second gear, and the second eccentric gear. According to the exemplary embodiment of the present disclosure, therefore, the differential assembly having two sets of the internal contact type planetary gear sets may serve as a compact differential unit having a simple structure.

In the differential assembly, the first eccentric plate, the second eccentric plate, and the dual teeth eccentric member having the first gear and the second gear are overlapped to one another in the axial direction. In other words, the first eccentric plate, the second eccentric plate, and the dual teeth eccentric member are arranged in parallel in a radial direction. According to the exemplary embodiment of the present disclosure, therefore, the differential assembly may be downsized especially in the axial direction.

In the differential assembly, a cycloid gear is employed as the first gear, the first eccentric gear, the second gear, and the second eccentric gear. In addition, according to the exemplary embodiment of the present disclosure, a difference between the numbers of teeth of the first gear and the first eccentric gear is set to 1, and a difference between the numbers of teeth of the second gear and the second eccentric gear is also set to 1. According to the exemplary embodiment of the present disclosure, therefore, a speed reducing ratio of the internal contact type planetary gear set formed by the first gear and the first eccentric gear may be increased to a maximum ratio, and a speed reducing ratio of the internal contact type planetary gear set formed by the second gear and the second eccentric gear may also be increased to a maximum ratio.

The first motion translating mechanism may also be formed by the first output eccentric gear as an internal gear formed integrally with the first eccentric gear, and the first output gear as an external gear mounted on the first rotary shaft while being meshed with the first output eccentric gear. In this case, a revolving motion of a two-stage gear formed of the first output eccentric gear and the first eccentric gear around the rotational center axis is translated into a rotary motion of the first rotary shaft around the rotational center axis by the first motion translating mechanism. Otherwise, a rotary motion of the first rotary shaft around the rotational center axis is translated into a revolving motion of the two-stage gear formed of the first output eccentric gear and the first eccentric gear around the rotational center axis by the first motion translating mechanism.

Likewise, the second motion translating mechanism may also be formed by the second output eccentric gear as an external gear formed integrally with the second eccentric gear, and the second output gear as an internal gear mounted on the second rotary shaft while being meshed with the second output eccentric gear. In this case, a revolving motion of a two-stage gear formed of the second output eccentric gear and the second eccentric gear around the rotational center axis is translated into a rotary motion of the second rotary shaft around the rotational center axis by the second motion translating mechanism. Otherwise, a rotary motion of the second rotary shaft around the rotational center axis is translated into a revolving motion of the two-stage gear formed of the second output eccentric gear and the second eccentric gear around the rotational center axis by the second motion translating mechanism.

In this case, only the first output gear and the first eccentric gear are employed to serve as the first motion translating mechanism, and only the second output gear and the second eccentric gear are employed to serve as the second motion translating mechanism. That is, a gear mechanism of the differential assembly is formed only of the first gear, the first eccentric gear, the second gear, and the second eccentric gear, the first output gear, the first output eccentric gear, the second output gear, and the second output eccentric gear. According to the exemplary embodiment of the present disclosure, therefore, the differential assembly having four sets of the internal contact type planetary gear sets may serve as a compact differential unit having a simple structure.

In this case, a cycloid gear may also be employed as the first gear, the second gear, the first eccentric gear, the second eccentric gear, the first output gear, the second output gear, the first output eccentric gear, and the second output eccentric gear. In addition, a difference between the numbers of teeth of the first gear and the first eccentric gear is set to 1, and a difference between the numbers of teeth of the second gear and the second eccentric gear is also set to 1. Likewise, a difference between the numbers of teeth of the first output eccentric gear and the first output gear is set to 1, and a difference between the numbers of teeth of the second output gear and the second output eccentric gear is also set to 1. In this case, therefore, a speed reducing ratio of the internal contact type planetary gear set formed by the first gear and the first eccentric gear may be increased to a maximum ratio, and a speed reducing ratio of the internal contact type planetary gear set formed by the second gear and the second eccentric gear may be increased to a maximum ratio. Likewise, a speed reducing ratio of the internal contact type planetary gear set formed by the first output gear and the first output eccentric gear may be increased to a maximum ratio, and a speed reducing ratio of the internal contact type planetary gear set formed by the second output gear and the second output eccentric gear may be increased to a maximum ratio.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure which should not limit a scope of the present disclosure.

Figure 1:
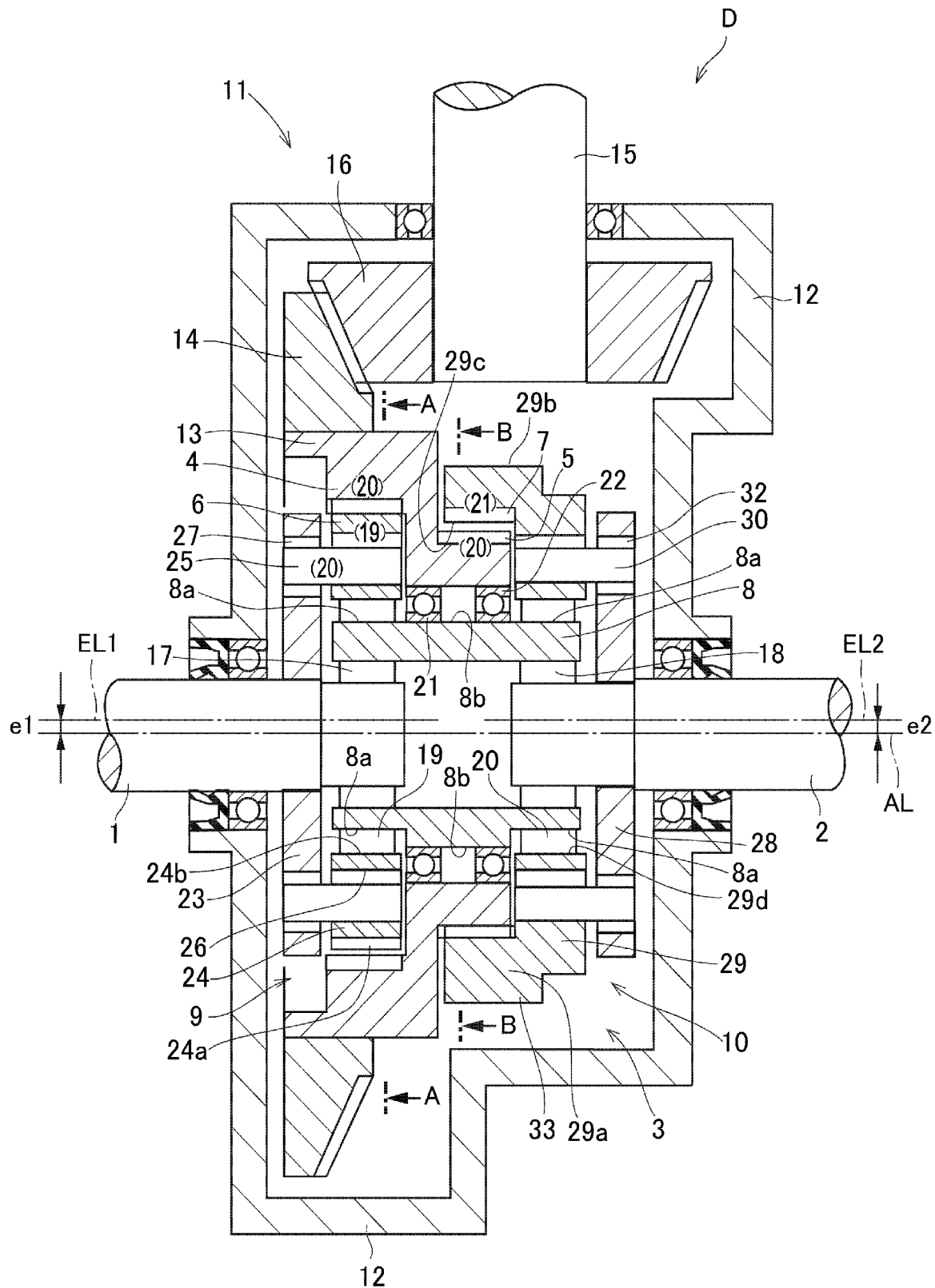
FIG. 1 is a cross-sectional view showing a structure of the differential assembly according to a first example of the present disclosure.

Referring now to FIG. 1, there is shown a structure of a differential assembly D as a transmission mechanism according to a first example of the present disclosure. The differential assembly D comprises a first rotary shaft 1, a second rotary shaft 2, and a differential mechanism 3. The differential mechanism 3 includes a first gear 4, a second gear 5, a first eccentric gear 6, a second eccentric gear 7, a supporting member 8, a first motion translating mechanism 9, and a second motion translating mechanism 10. The differential assembly D shown in FIG. 1 is designed to be mounted on a vehicle (not shown) to serve as a differential unit (i.e., a so-called "open differential") 11 that allows a differential rotation between a left wheel and a right wheel (neither of which are shown).

The first rotary shaft 1 and the second rotary shaft 2 are arranged coaxially with each other along a rotational center axis AL. The first rotary shaft 1 and the second rotary shaft 2 are supported by a case 12 of the differential assembly D through bearings (not shown) so that the first rotary shaft 1 and the second rotary shaft 2 are allowed to rotate relatively to each other. According to the first example shown in FIG. 1, specifically, a leading end of the first rotary shaft 1 serving as a driveshaft protrudes from the case 12 to be connected to any one of the right and left wheels, and a leading end of the second rotary shaft 2 also serving as a driveshaft protrudes from the case 12 to be connected to the other one of the right and left wheels.

The first gear 4 and the second gear 5 are formed integrally in order along the rotational center axis AL so that the first gear 4 and the second gear 5 are rotated integrally. The first gear 4 is supported by the supporting member 8 through a bearing 21, and the second gear 5 is supported by the supporting member 8 through a bearing 22.

Specifically, the first gear 4 as an internal gear is engaged with the first eccentric gear 6 as an external gear. On the other hand, the second gear 5 as an external gear is engaged with the second eccentric gear 7 as an internal gear. That is, the first gear 4 and the second gear 5 serve as a two-stage gear.

A drive input member 13 of the differential assembly D is formed integrally with the two-stage gear so that the drive input member 13 is rotated integrally with the first gear 4 and the second gear 5 by a drive torque delivered from a prime mover (not shown). According to the first example, a differential ring gear 14 is fitted onto the drive input member 13. The prime mover includes not only an engine and a drive motor but also a brake device. That is, not only a drive torque to propel the vehicle but also a brake torque to decelerate the vehicle is applied to the drive input member 13.

That is, the differential ring gear 14 is also integrated with the first gear 4 and the second gear 5 through the drive input member 13 so that the differential ring gear 14 is rotated integrally the first gear 4 and the second gear 5. Specifically, the differential ring gear 14 as a diametrically larger bevel gear is meshed with a drive pinion 16 as a diametrically smaller bevel gear fitted onto a leading end of a propeller shaft 15 of the vehicle. The number of teeth of the drive pinion 16 is less than the number of teeth of the differential ring gear 14. That is, the drive pinion 16 and the differential ring gear 14 serve as a final reduction gear unit of the vehicle. The other end of the propeller shaft 15 (not shown) is joined to the prime mover of the vehicle. Thus, the differential unit 11 is connected to the prime mover of the vehicle though the differential ring gear 14 and the propeller shaft 15.

The first eccentric gear 6 is formed around a first eccentric axis EL1 which extends parallel to the rotational center axis AL while being supported by the supporting member 8 though a bearing 19. As described, the first eccentric gear 6 is meshed with the first gear 4 from radially inner side so that the first eccentric gear 6 rotates around the first eccentric axis EL1 and revolves around the rotational center axis AL. That is, the first gear 4 and the first eccentric gear 6 serve as a "first internal contact type planetary gear set". As described later, the first eccentric gear 6 is formed on an outer circumferential surface 24a of a first eccentric plate 24.

The second eccentric gear 7 is formed around a second eccentric axis EL2 which extends parallel to the rotational center axis AL while being supported by the supporting member 8 though a bearing 20. According to the present disclosure, the first eccentric axis EL1 and the second eccentric axis EL2 may be not only a common axis but also different axes extending parallel to each other. In the first example, the first eccentric axis EL1 and the second eccentric axis EL2 extend along a common axis. The first eccentric gear 6 and the second eccentric gear 7 are allowed to rotate relatively to each other. As described, the second gear 5 is meshed with the second eccentric gear 7 from radially inner side so that the second eccentric gear 7 revolves around the rotational center axis AL. In other words, the second gear 5 rotates around the rotational center axis AL to revolve the second eccentric gear 7 around the rotational center axis AL. That is, the second gear 5 and the second eccentric gear 7 serve as a "second internal contact type planetary gear set". As described later, the second eccentric gear 7 is formed on an inner circumferential surface 29c of a second eccentric plate 29.

The supporting member 8 as a cylindrical rotary member is arranged coaxially with each other around the first rotary shaft 1 and the second rotary shaft 2 while being supported rotatably by bearings 17 and 18 such as a roller bearing and a needle bearing. That is, the first rotary shaft 1, the supporting member 8, and the second rotary shaft 2 are allowed to rotate relatively to one another.

Figure 2:
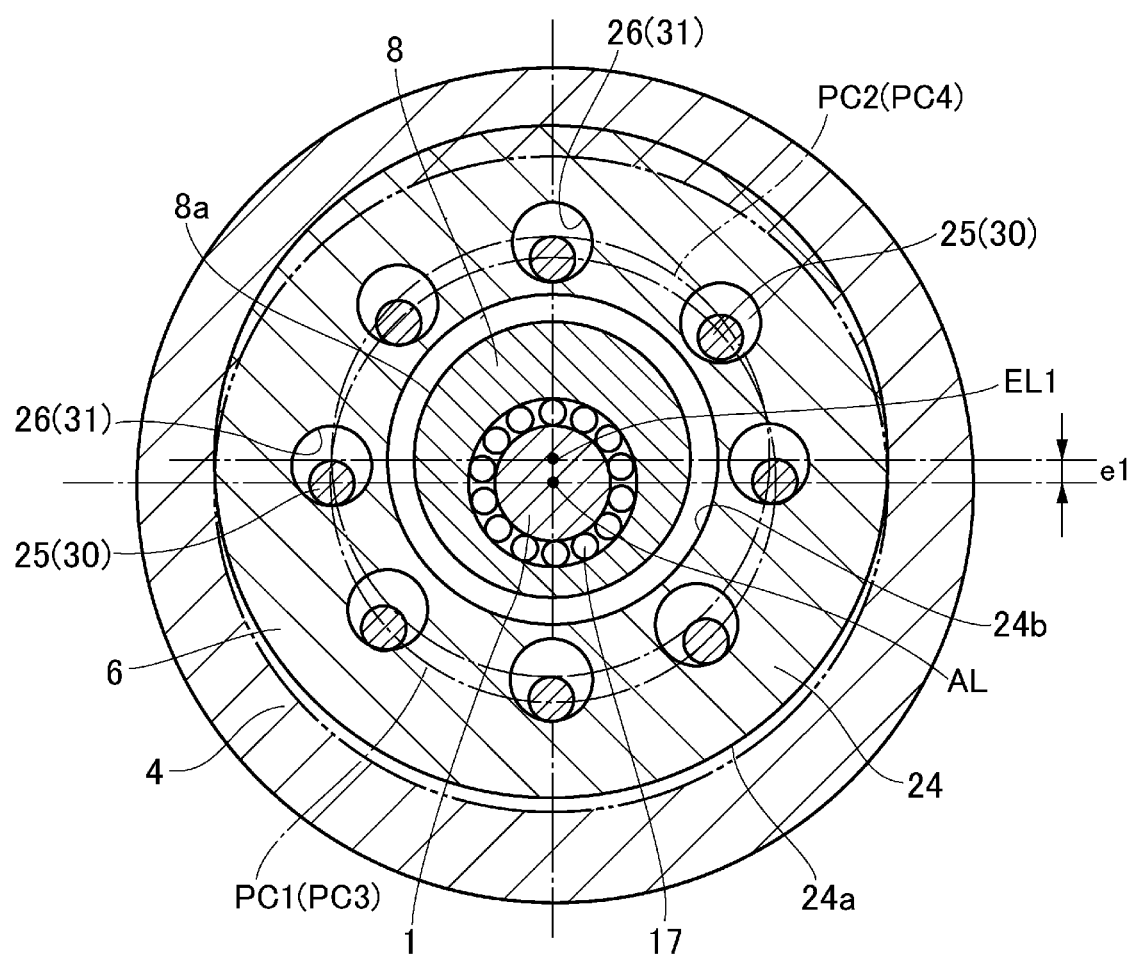
FIG. 2 is a cross-sectional view showing a cross-section of the differential assembly according to the first example along A-A line in FIG. 1.

As illustrated in FIGS. 1 and 2, the first eccentric axis EL1 and the second eccentric axis EL2 extend parallel to the rotational center axis AL of the supporting member 8 and is offset from the rotational center axis AL. In the example shown in FIG. 2, the first eccentric axis EL1 is offset upwardly in FIGS. 1 and 2 from the rotational center axis AL in an amount of eccentricity e1. Likewise, the second eccentric axis EL2 is offset upwardly in FIGS. 1 and 2 from the rotational center axis AL in an amount of eccentricity e2. As described, in the first example, the first eccentric axis EL1 and the second eccentric axis EL2 extend along a common axis, therefore, the amount of eccentricity e1 and the amount of eccentricity e2 are equal to each other.

As shown in FIG. 2, an outer circumferential surface 8a at each end of the supporting member 8 has a circular cross-section around the first eccentric axis EL1 and the second eccentric axis EL2. That is, the end sections of the supporting member 8 rotate around the first eccentric axis EL1 and the second eccentric axis EL2. As illustrated in FIG. 1, the first eccentric gear 6 is supported by the outer circumferential surface 8a of one end of the supporting member 8 through a bearing 19, and the second eccentric gear 7 is supported by the outer circumferential surface 8a of the other end of the supporting member 8 through a bearing 20. For example, a roller bearing and a needle bearing may be adopted as the bearings 19 and 20.

Figure 3:
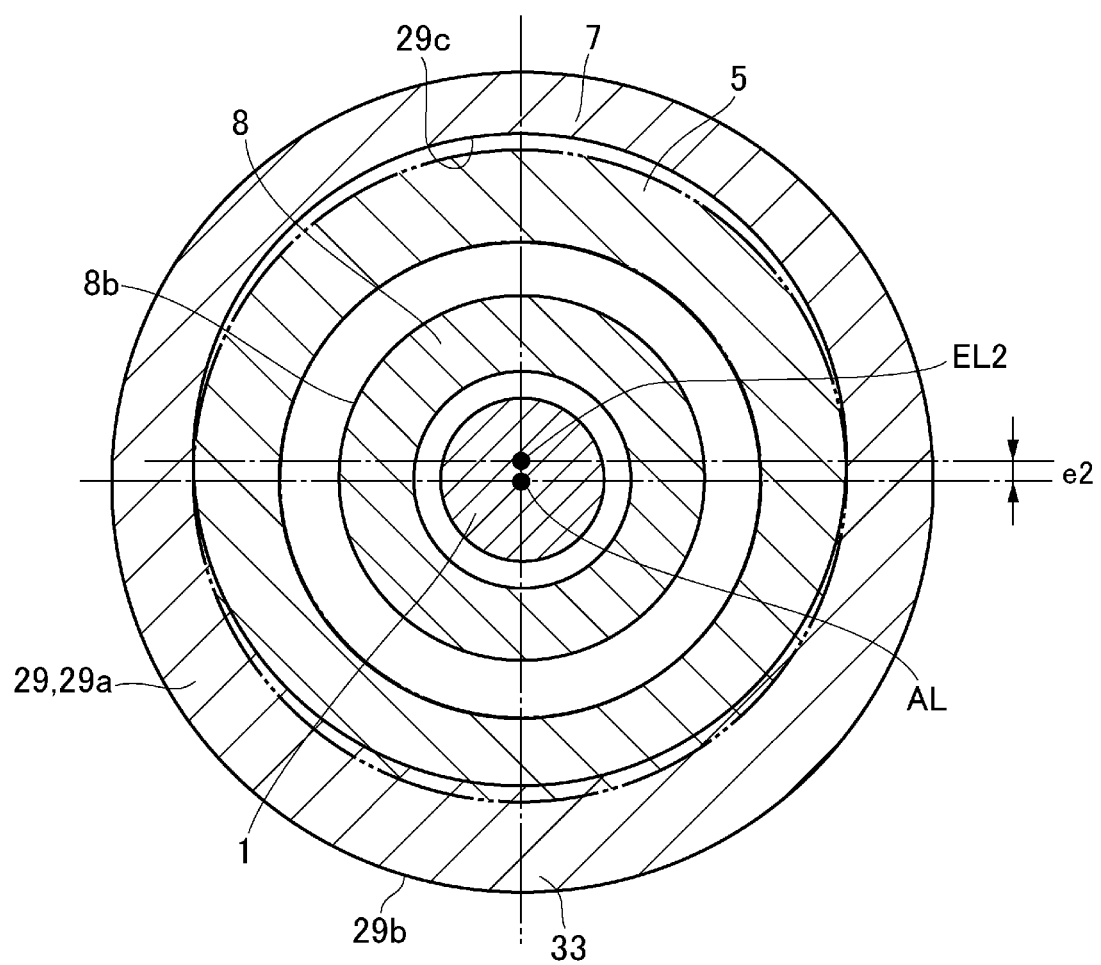
FIG. 3 is a cross-sectional view showing a cross-section of the differential assembly according to the first example along B-B line in FIG. 1.

As shown in FIG. 3, an outer circumferential surface 8b at an intermediate portion of the supporting member 8 has a circular cross-section around the rotational center axis AL. That is, the intermediate section of the supporting member 8 rotates around the rotational center axis AL. As illustrated in FIG. 1, the first gear 4 and the second gear 5 are supported by the outer circumferential surface 8b of the intermediate section of the supporting member 8 through bearing 21 and 22. For example, a roller bearing and a needle bearing may also be adopted as the bearings 21 and 22. Thus, the supporting member 8 supports the first gear 4 and the second gear 5 in such a manner as to allow the first gear 4 and the second gear 5 to rotate relatively to each other, and rotates around the rotational center axis AL while supporting revolving motions of the first eccentric gear 6 and the second eccentric gear 7.

As described, the differential mechanism 3 of the differential assembly D comprises two sets of the internal contact type planetary gear sets commonly using the supporting member 8. Specifically, the first internal contact type planetary gear set comprises the first gear 4 and the first eccentric gear 6, and the second internal contact type planetary gear set comprises the second gear 5 and the second eccentric gear 7. In other words, the differential mechanism 3 is formed by combining the first internal contact type planetary gear set with the second internal contact type planetary gear set. Such internal contact type planetary gear set does not have a planetary pinion, and therefore, a structure of the internal contact type planetary gear set is simpler than that of a conventional planetary gear set in which a planetary pinion is interposed between a sun gear and a ring gear. In addition, as described later, a cycloid gear is adopted as each gear of the internal contact type planetary gear sets. In the differential mechanism 3, therefore, a relatively large speed reducing ratio may be achieved between the first eccentric gear 6 and the two-stage gear formed of the first gear 4 and the second gear 5, and a relatively large speed reducing ratio may also be achieved between the second eccentric gear 7 and the two-stage gear.

As described, the differential assembly D further comprises the first motion translating mechanism 9 and the second motion translating mechanism 10. Specifically, the first motion translating mechanism 9 translates a revolving motion of the first eccentric gear 6 into a rotary motion of the first rotary shaft 1, and translates the rotary motion of the first rotary shaft 1 into the revolving motion of the first eccentric gear 6. On the other hand, the second motion translating mechanism 10 translates a revolving motion of the second eccentric gear 7 into a rotary motion of the second rotary shaft 2, and translates the rotary motion of the second rotary shaft 2 into the revolving motion of the second eccentric gear 7. For example, the principle of pin gear and the principle of the internal contact type planetary gear set may be applied to the motion translating mechanisms. According to the first example, a reaction pin and a reaction hole are employed as the motion translating mechanisms.

According to the first example, the first motion translating mechanism 9 comprises a first plate 23, the first eccentric plate 24, a first reaction pin 25, and a first reaction hole 26.

The first plate 23 is a disc-shaped rotary member, and is mounted on the first rotary shaft 1 to be rotated integrally with the first rotary shaft 1. As explained later, a plurality of the first reaction pins 25 are installed on the first plate 23.

The first eccentric plate 24 is an annular plate member arranged around the first eccentric axis EL1 while being opposed to the first plate 23. According to the first example, the first eccentric plate 24 serves as a base portion of the first eccentric gear 6, and outer teeth of the first eccentric gear 6 are formed on the outer circumferential surface 24a of the first eccentric plate 24. An inner circumferential surface 24b of the first eccentric plate 24 is supported by the supporting member 8 through the bearing 19 so that the first eccentric plate 24 revolves together with the first eccentric gear 6 when the first eccentric gear 6 rotates along the first gear 4.

Each of the first reaction pins 25 is a column-shaped fixing member, and as illustrated in FIG. 2, the first reaction pins 25 are arranged on a pitch circle PC1 drawn on the first plate 23 around the rotational center axis AL. In the example shown in FIG. 2, eight of the first reaction pins 25 are arranged in total on the pitch circle PC1 at regular intervals to protrude from the first plate 23 in the axial direction. According to the first example, each of the first reaction pins 25 is individually supported on the first plate 23 in a rotatable manner by a bearing 27 including a roller bearing and a needle bearing.

Each of the first reaction holes 26 is a dent or a through hole, and as illustrated in FIG. 2, the first reaction holes 26 are formed on the first eccentric plate 24 around a pitch circle PC2 drawn on the first eccentric plate 24 around the first eccentric axis ELL In the example shown in FIG. 2, eight of the first reaction holes 26 are formed in total on the pitch circle PC2 drawn on the first eccentric plate 24, at sites corresponding to the first reaction pins 25 protruding from the first plate 23. Accordingly, the first reaction pins 25 protruding from the first plate 23 are individually inserted loosely into the first reaction holes 26 formed on the first eccentric plate 24. Specifically, in order to allow the first eccentric plate 24 to revolve smoothly without causing an interference between the first reaction pins 25 and the first reaction holes 26, an inner diameter of each of the first reaction holes 26 is individually larger than an outer diameter of each of the first reaction pins 25. To this end, for example, a difference between the inner diameter of the first reaction hole 26 and the outer diameter of the first reaction pin 25 is set larger than the amount of eccentricity e1 of the first eccentric axis EL1 with respect to the rotational center axis AL.

Thus, when the first eccentric plate 24 revolves together with the first eccentric gear 6 around the rotational center axis AL, the first motion translating mechanism 9 allows the first plate 23 to rotate around the rotational center axis AL, while absorbing the eccentric displacement of the first eccentric plate 24 by a space maintained between the first reaction hole 26 and the first reaction pin 25. Likewise, when the first plate 23 rotates around the rotational center axis AL, the first motion translating mechanism 9 allows the first eccentric plate 24 to revolve together with the first eccentric gear 6 around the rotational center axis AL, while absorbing the eccentric displacement of the first eccentric plate 24 by the space maintained between the first reaction hole 26 and the first reaction pin 25. That is, the first motion translating mechanism 9 translates the revolving motion of the first eccentric gear 6 into the rotary motion of the first rotary shaft 1, and translates the rotary motion of the first rotary shaft 1 into the revolving motion of the first eccentric gear 6.

Likewise, according to the first example, the second motion translating mechanism 10 comprises a second plate 28, the second eccentric plate 29, a second reaction pin 30, and a second reaction hole 31.

The second plate 28 is a disc-shaped rotary member, and is mounted on the second rotary shaft 2 to be rotated integrally with the second rotary shaft 2. As explained later, a plurality of the second reaction pins 30 are installed on the second plate 28.

The second eccentric plate 29 is an annular plate member arranged around the second eccentric axis EL2 while being opposed to the second plate 28. According to the first example, the second eccentric plate 29 serves as a base portion of the second eccentric gear 7, and a cylindrical portion 29a is formed on an outer circumferential portion of the second eccentric plate 29 to protrude in the axial direction. An outer circumferential surface 29b of the cylindrical portion 29a has a circular cross-section around the rotational center axis AL, and an inner circumferential surface 29c of the cylindrical portion 29a has a circular cross-section around the second eccentric axis EL2. That is, the inner circumferential surface 29c of the cylindrical portion 29a is offset with respect to the second eccentric plate 29 in the amount of eccentricity e2, and inner teeth of the second eccentric gear 7 are formed on the inner circumferential surface 29c of the cylindrical portion 29a. In other words, the second eccentric gear 7 is offset upwardly in FIGS. 1 and 3 from the rotational center axis AL in the amount of eccentricity e2. An inner circumferential surface 29d of the second eccentric plate 29 is supported by the supporting member 8 through the bearing 20 so that the second eccentric plate 29 revolves together with the second eccentric gear 7 when the second eccentric gear 7 rotates around the second eccentric gear 7.

Each of the second reaction pins 30 is a column-shaped fixing member, and as illustrated in FIG. 2, the second reaction pins 30 are arranged on a pitch circle PC3 drawn on the second plate 28 around the rotational center axis AL. In the example shown in FIG. 2, eight of the second reaction pins 30 are arranged in total on the pitch circle PC3 at regular intervals to protrude from the second plate 28 in the axial direction. According to the first example, each of the second reaction pins 30 is individually supported on the second plate 28 in a rotatable manner by a bearing 32 including a roller bearing and a needle bearing.

Each of the second reaction holes 31 is a dent or a through hole, and as illustrated in FIG. 2, the second reaction holes 31 are formed on the second eccentric plate 29 around a pitch circle PC4 drawn on the second eccentric plate 29 around the second eccentric axis EL2. In the example shown in FIG. 2, eight of the second reaction holes 31 are formed in total on the pitch circle PC4 drawn on the second eccentric plate 29, at sites corresponding to the second reaction pins 30 protruding from the second plate 28. Accordingly, the second reaction pins 30 protruding from the second plate 28 are individually inserted loosely into the second reaction holes 31 formed on the second eccentric plate 29. Specifically, in order to allow the second eccentric plate 29 to revolve smoothly without causing an interference between the second reaction pins 30 and the second reaction holes 31, an inner diameter of each of the second reaction holes 31 is individually larger than an outer diameter of each of the second reaction pins 30. To this end, for example, a difference between the inner diameter of the second reaction hole 31 and the outer diameter of the second reaction pin 30 is set larger than the amount of eccentricity e2 of the second eccentric axis EL2 with respect to the rotational center axis AL.

Thus, when the second eccentric plate 29 revolves together with the second eccentric gear 7 around the rotational center axis AL, the second motion translating mechanism 10 allows the second plate 28 to rotate around the rotational center axis AL, while absorbing the eccentric displacement of the second eccentric plate 29 by a space maintained between the second reaction hole 31 and the second reaction pin 30. Likewise, when the second plate 28 rotates around the rotational center axis AL, the second motion translating mechanism 10 allows the second eccentric plate 29 to revolve together with the second eccentric gear 7 around the rotational center axis AL, while absorbing the eccentric displacement of the second eccentric plate 29 by the space maintained between the first reaction hole 26 and the first reaction pin 25. That is, the second motion translating mechanism 10 translates the revolving motion of the second eccentric gear 7 into the rotary motion of the second rotary shaft 2, and translates the rotary motion of the second rotary shaft 2 into the revolving motion of the second eccentric gear 7.

Thus, in the differential assembly D, the first rotary shaft 1, the second rotary shaft 2, the differential mechanism 3, the first motion translating mechanism 9, the second motion translating mechanism 10 serve as the differential unit 11. In the differential unit 11, a drive torque generated by the prime mover is applied to the drive input member 13, and distributed to the first rotary shaft 1 and the second rotary shaft 2. Specifically, the drive torque is distributed to the first eccentric gear 6 though the first gear 4 and to the second eccentric gear 7 through the second gear 5. Then, the drive torque is further delivered from the first eccentric gear 6 to the first rotary shaft 1 through the first motion translating mechanism 9, and from the second eccentric gear 7 to the second rotary shaft 2 through the second motion translating mechanism 10. For example, given that the first rotary shaft 1 and the second rotary shaft 2 are rotated at a same speed in a same direction, the first rotary shaft 1, the second rotary shaft 2, and the differential mechanism 3 are rotated integrally. In this case, the drive torque is distributed equally to the first rotary shaft 1 and the second rotary shaft 2. By contrast, given that the first rotary shaft 1 and the second rotary shaft 2 are rotated at different speeds, the first rotary shaft 1 and the second rotary shaft 2 are rotated differentially in opposite directions.

In order to allow the first rotary shaft 1 and the second rotary shaft 2 to rotate in opposite directions, a gear ratio between the first gear 4 and the first eccentric gear 6, and a gear ratio between the second gear 5 and the second eccentric gear 7 are set to different values. According to the present disclosure, a ratio of the number of teeth $z_{1B}$ of the first eccentric gear 6 to the number of teeth $z_{1A}$ of the first gear 4 will be referred to as a first gear ratio $u_1$ between the first gear 4 and the first eccentric gear 6, and a ratio of the number of teeth $z_{2B}$ of the second eccentric gear 7 to the number of teeth $z_{2A}$ of the second gear 5 will be referred to as a second gear ratio $u_2$ between the second gear 5 and the second eccentric gear 7.

According to the first example, the number of teeth $z_{1A}$ of the first gear 4 and the number of teeth $z_{2A}$ of the second gear 5 are 20. On the other hand, the number of teeth $z_{1B}$ of the first eccentric gear 6 is 19, and the number of teeth $z_{2B}$ of the second eccentric gear 7 is 21. Accordingly, the first gear ratio $u_1$ may be expressed as:

$$u_1 = z_{1B}/z_{1A} = 19/20 = 0.950; \text{ and}$$

the second gear ratio $u_2$ may be expressed as:

$$u_2 = z_{2A}/z_{2B} = 20/21 \approx 0.9524.$$

As described, the number of teeth $z_{1A}$ of the first gear 4 and the number of teeth $z_{2A}$ of the second gear 5 are equal to each other. On the other hand, the number of teeth $z_{1B}$ of the first eccentric gear 6 is one less than the number of teeth $z_{1A}$ of the first gear 4, and the number of teeth $z_{2B}$ of the second eccentric gear 7 is one more than the number of teeth $z_{2A}$ of the second gear 5. For these reasons, the first gear ratio $u_1$ and the second gear ratio $u_2$ are slightly different from each other.

As described, in the differential assembly D, the first internal contact type planetary gear set is combined with the second internal contact type planetary gear set to serve as the differential mechanism 3. According to the first example, the first internal contact type planetary gear set comprises the first gear 4 and the first eccentric gear 6, and the second internal contact type planetary gear set comprises the second gear 5 and the second eccentric gear 7. That is, the differential mechanism 3 is a complex planetary gear set formed by combining the first internal contact type planetary gear set with the second internal contact type planetary gear set. In the first complex planetary gear set thus structured, the first gear ratio $u_1$ and the second gear ratio $u_2$ are slightly different from each other. Given that the first gear ratio $u_1$ and the second gear ratio $u_2$ are equal to each other, a speed reducing ratio of the complex planetary gear set as a speed ratio of an output element to an input element would reach an infinite value. Specifically, an inverse number of a ratio of a speed of the first eccentric gear 6 to a speed of the drive input member 13 would reach an infinite value, and an inverse number of a ratio of a speed of the second eccentric gear 7 to the speed of the drive input member 13 would reach an infinite value. In this case, the complex planetary gear set would not function properly. Whereas, since the first gear ratio $u_1$ and the second gear ratio $u_2$ are set to different values, the speed reducing ratio of the complex planetary gear set can be increased without reaching the infinite value. For example, the speed reducing ratio of the complex planetary gear set may be reduced by increasing the difference between the first gear ratio $u_1$ and the second gear ratio $u_2$. By contrast, the speed reducing ratio of the complex planetary gear set may be increased by reducing the difference between the first gear ratio $u_1$ and the second gear ratio $u_2$.

As described, in the differential assembly D serving as the differential unit 11, the drive torque applied to the drive input member 13 is distributed to the first eccentric gear 6 and the second eccentric gear 7. In this situation, if the first rotary shaft 1 and the second rotary shaft 2 are rotated at a same speed, the first eccentric gear 6 and the second eccentric gear 7 are rotated integrally.

As also described, the number of teeth $z_{1A}$ of the first gear 4 and the number of teeth $z_{2A}$ of the second gear 5 are equal to each other, and the number of teeth $z_{1B}$ of the first eccentric gear 6 is two less than the number of teeth $z_{2B}$ of the second eccentric gear 7. Therefore, when the first gear 4 and the second gear 5 are rotated, the first eccentric gear 6 is rotated slower than a rotational speed of the second eccentric gear 7 due to the fact that the number of teeth $z_{1B}$ of the first eccentric gear 6 is two less than the number of teeth $z_{2B}$ of the second eccentric gear 7. In other words, the second eccentric gear 7 is rotated faster than a rotational speed of the first eccentric gear 6 due to the fact that the number of teeth $z_{2B}$ of the second eccentric gear 7 is two more than the number of teeth $z_{1B}$ of the first eccentric gear 6. Consequently, the first eccentric gear 6 and the second eccentric gear 7 are rotated in opposite directions. In this situation, given that the first rotary shaft 1 and the second rotary shaft 2 are rotated at the same speed, the first eccentric gear 6 revolves along the first gear 4 around the rotational center axis AL, and the second eccentric gear 7 revolves around the second gear 5 and the rotational center axis AL. Therefore, torques are applied to an engagement site between the first gear 4 and the first eccentric gear 6, and to an engagement site between the second gear 5 and the second eccentric gear 7 in opposite directions thereby causing interference between those engagement sites. As a result, the differential assembly D is substantially brought into engagement to rotate integrally so that the first rotary shaft 1 and the second rotary shaft 2 are rotated integrally without rotating relatively to each other.

By contrast, given that the first rotary shaft 1 and the second rotary shaft 2 are rotated at different speeds so that the first eccentric gear 6 and the second eccentric gear 7 are rotated in a differential manner, the differential assembly D will not be brought into engagement by such interference between the above-mentioned engagement sites. In this case, the drive torque is distributed from the drive input member 13 to the first eccentric gear 6 and to the second eccentric gear 7 while rotating the first eccentric gear 6 and the second eccentric gear 7 relatively to each other. Consequently, torques are applied to the engagement site between the first gear 4 and the first eccentric gear 6 and to the engagement site between the second gear 5 and the second eccentric gear 7 in opposite directions thereby rotating the first eccentric gear 6 and the second eccentric gear 7 in opposite directions. That is, the rotational direction of the second eccentric gear 7 is reversed to the opposite direction to the rotational direction of the first eccentric gear 6. As a result, the first rotary shaft 1 and the second rotary shaft 2 are rotated differentially in opposite directions.

Thus, the differential assembly D comprises two sets of the internal contact type planetary gear sets. In the differential assembly D, the drive torque delivered from the prime mover is distributed to the first rotary shaft 1 and the second rotary shaft 2, and a speed difference between the first rotary shaft 1 and the second rotary shaft 2 is absorbed by the differential mechanism 3. For this reason, the differential assembly D may serve as a compact differential unit having a simple structure.

As illustrated in FIGS. 1 and 3, in the second eccentric plate 29, a thickness of a lower section of the cylindrical portion 29a is increased thicker than the remaining section to serve as a counterbalance weight 33. Thus, the counterbalance weight 33 is formed integrally with the second eccentric plate 29 while adjusting a weight to a desirable value. Instead, the counterbalance weight 33 may also be formed separately to be attached to an outer circumferential surface of the second eccentric plate 29.

As explained above, the internal gears such as the first gear 4 and the second eccentric gear 7 rotate (or revolve) eccentrically about the external gears such as the first eccentric gear 6 and the second gear 5. Consequently, the second eccentric gear 7 rotates out-of-balance due to imbalance of weights of the internal gears revolving around the rotational center axis AL. In order to correct such unbalance of rotation of the second eccentric gear 7, the counterbalance weight 33 is formed on the second eccentric plate 29. To this end, for example, the counterbalance weight 33 is formed on the cylindrical portion 29a of the second eccentric plate 29 at a site out of phase with the engagement site of the second eccentric gear 7 on an orbit path of the second eccentric gear 7 by 180 degrees. In the differential assembly D, gear teeth are not formed on the outer circumferential surface 29b of the second eccentric gear 7. Therefore, an outer diameter of the unit of the second eccentric plate 29 may be reduced so that a space for the counterbalance weight 33 may be ensured on the outer circumferential surface 29b of the second eccentric gear 7. Thus, rotations of the rotary members in the differential assembly D may be stabilized by the counterbalance weight 33.

Other examples of the differential assembly D according to the present disclosure are shown in FIGS. 4 to 14. According to the second to sixth examples shown in FIGS. 4 to 9, the reaction pins and the reaction holes serve as the motion translating mechanism. In the following examples, common reference numerals are assigned to the elements in common with those of the differential assembly D shown in FIG. 1.

The differential assembly D may serve as a torque vectoring device by combining the differential mechanism 3 with an actuator (or a prime mover) that generates a control torque to causes a differential rotation in the differential mechanism 3. According to the second example shown in FIG. 4, the differential assembly D according to the first example is combined with a control motor to serve as a differential unit 40 having a torque vectoring function.

Specifically, a control motor 41 as an electric motor is adopted as the actuator to generate a control torque for controlling a differential rotation between the first rotary shaft 1 and the second rotary shaft 2. For example, an induction motor and a permanent magnet synchronous motor may be adopted as the control motor 41, and the control motor 41 is arranged coaxially with the first rotary shaft 1 and the second rotary shaft 2.

The control motor 41 comprises a rotor 41a, and an output shaft 41b as a rotary shaft of the rotor 41a. The output shaft 41b of the control motor 41 is connected to the differential mechanism 3 to transmit the control torque to the differential mechanism 3. In the differential assembly D according to the second example, specifically, a supporting carrier 42 is arranged between the differential mechanism 3 and the control motor 41, and the output shaft 41b is connected to the supporting carrier 42 through an after-mentioned speed reducing planetary gear set 44.

The supporting carrier 42 as another supporting member of the present disclosure revolvably supports any one of the first eccentric gear 6 and the second eccentric gear 7, and the control torque generated by the control motor 41 is applied to the supporting carrier 42. According to the second example, the supporting carrier 42 supports the second eccentric gear 7 together with the supporting member 8 such that the second eccentric gear 7 is allowed to revolve (or rotate eccentrically), and the control torque of the control motor 41 is delivered to the differential mechanism 3 through the supporting carrier 42. Specifically, the supporting carrier 42 is a disc-shaped rotary member arranged around the rotational center axis AL, and the supporting carrier 42 is mounted on the second rotary shaft 2 through a bearing (not shown) so that the supporting carrier 42 is allowed to rotate relatively to the second rotary shaft 2. A cylindrical portion 42a is formed on an outer circumferential portion of the supporting carrier 42 to protrude in the axial direction, and the second eccentric gear 7 is rotatably held by an inner circumferential surface 42b of the cylindrical portion 42a through a bearing 43 including a roller bearing and a needle bearing.

As described, the inner circumferential surface 29d of the second eccentric plate 29 on which the second eccentric gear 7 is formed is supported by the supporting member 8 in such a manner as to revolve around the rotational center axis AL. On the other hand, the supporting carrier 42 rotates around the rotational center axis AL. Therefore, when the supporting carrier 42 is rotated, the second eccentric gear 7 is rotated relatively to the supporting carrier 42 while transmitting torque between the supporting carrier 42 and the second eccentric gear 7.

As also described, the drive torque applied to the drive input member 13 is distributed to the first eccentric gear 6 and the first rotary shaft 1, and to the second eccentric gear 7 and the second rotary shaft 2. Whereas, the control torque of the control motor 41 is applied to the supporting carrier 42. The control torque delivered to the supporting carrier 42 is delivered to the first eccentric gear 6 and the second eccentric gear 7 while being multiplied, and further delivered to the first rotary shaft 1 and the second rotary shaft 2. Consequently, the first rotary shaft 1 and the second rotary shaft 2 are rotated in a differential manner in opposite directions.

According to the second example, a speed reducing ratio between the supporting carrier 42 and the first eccentric gear 6 is referred to as a first speed reducing ratio, and a speed reducing ratio between the supporting carrier 42 and the second eccentric gear 7 is referred to as a second speed reducing ratio. In the differential assembly D according to the second example, the first speed reducing ratio and the second speed reducing ratio are equal or approximated to each other. In other words, the first speed reducing ratio is an inverse number of a ratio of a rotational speed of the first eccentric gear 6 to a rotational speed of the supporting carrier 42, and the second speed reducing ratio is an inverse number of a ratio of a rotational speed of the second eccentric gear 7 to a rotational speed of the supporting carrier 42.

In the differential assembly D according to the second example, rotational speeds of both of the first eccentric gear 6 and the second eccentric gear 7 are reduced with respect to a rotational speed of the supporting carrier 42. That is, an absolute value of each of the first speed reducing ratio and the second speed reducing ratio is individually greater than 1. In the differential assembly D, therefore, the control torque applied to the supporting carrier 42 from the control motor 41 is delivered to the first eccentric gear 6 and the second eccentric gear 7 while being multiplied.

Figure 4:
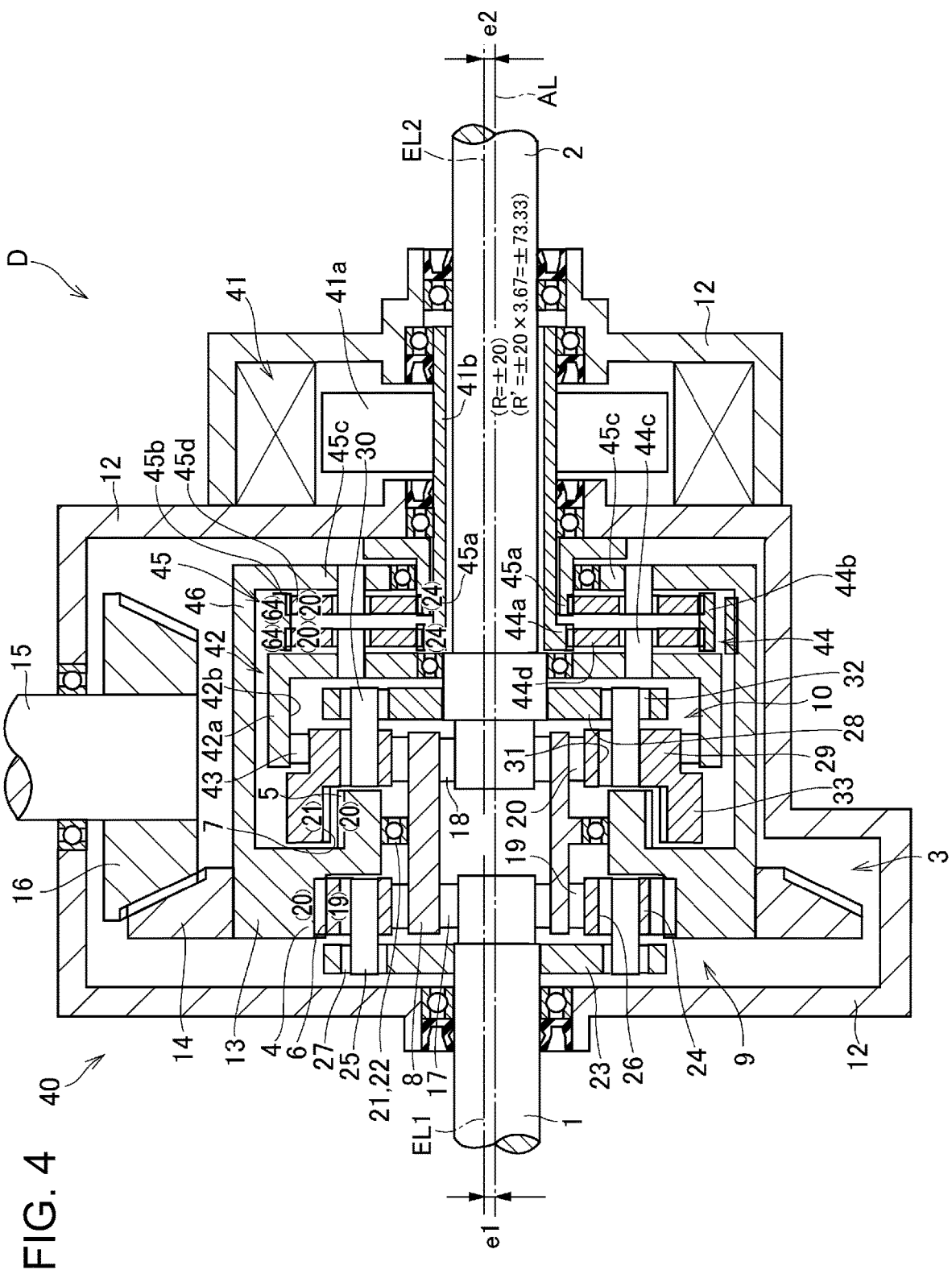
FIG. 4 is a cross-sectional view showing a structure of the differential assembly according to a second example of the present disclosure.

As described, in the differential assembly D shown in FIG. 4, the number of teeth $z_{1A}$ of the first gear 4 and the number of teeth $z_{2A}$ of the second gear 5 are 20. On the other hand, the number of teeth $z_{1B}$ of the first eccentric gear 6 is 19, and the number of teeth $z_{2B}$ of the second eccentric gear 7 is 21. Accordingly, the first speed reducing ratio $R_1$ between the supporting carrier 42 and the first eccentric gear 6 may be expressed as:

$$R_1 = 1/(1 - z_{1B}/z_{1A})$$
$$= 1/(1 - 19/20)$$
$$= 20.$$

In general, speed reducing ratios achieved by the conventional planetary gear sets falls within a range of approximately 4 to 10. Thus, the first speed reducing ratio $R_1$ is greater than the speed reducing ratios of the conventional planetary gear sets.

Likewise, the second speed reducing ratio $R_2$ between the supporting carrier 42 and the second eccentric gear 7 may be expressed as:

$$R_2 = 1/(1 - z_{2B}/z_{2A})$$
$$= 1/(1 - 21/20)$$
$$= -20.$$

Thus, the second speed reducing ratio $R_2$ is also greater than the speed reducing ratios of the conventional planetary gear sets. As a result of applying the control torque to the supporting carrier 42, a rotational direction of the second eccentric gear 7 serving as an output element is reversed to the opposite direction to the rotational direction of the supporting carrier 42 serving as an input element. Therefore, the second speed reducing ratio $R_2$ is referred to as a negative value (e.g., −20) for the sake of convenience, and in the second example shown in FIG. 4, the speed reducing ratios $R_1$ and $R_2$ are indicated commonly as R=±20.

Thus, in the differential assembly D shown in FIG. 4, the first eccentric gear 6 and the second eccentric gear 7 are rotated differentially in opposite directions by rotating the supporting carrier 42 by the control torque. As described, the first speed reducing ratio $R_1$ as the ratio of a rotational speed of the first eccentric gear 6 to a rotational speed of the supporting carrier 42 and the second speed reducing ratio $R_2$ as the ratio of a rotational speed of the second eccentric gear 7 to a rotational speed of the supporting carrier 42 are equal or approximated to each other. In the differential assembly D shown in FIG. 4, therefore, the control torque generated by the control motor 41 is delivered to the first eccentric gear 6 and the second eccentric gear 7 while being multiplied by substantially same amplification factors.

In the differential assembly D shown in FIG. 4, the supporting carrier 42 as the input element is rotated in the forward direction when the control motor 41 is rotated in the forward direction (i.e., clockwise). In this situation, the first eccentric gear 6 as the output element is rotated in the forward direction, and the second eccentric gear 7 is rotated in the reverse direction (i.e., counterclockwise). According to the present disclosure, the speed reducing ratio of the differential assembly D may be changed by changing the numbers of teeth of the gears 4 and 5, and the numbers of teeth of the eccentric gears 6 and 7. In addition, the rotational directions of the first eccentric gear 6 as the output element and the second eccentric gear 7 may be switched by changing the numbers of teeth of the gears 4 and 5, and the numbers of teeth of the eccentric gears 6 and 7.

For these purposes, a cycloid gear may be adopted as the first gear 4, the first eccentric gear 6, the second gear 5, and the second eccentric gear 7. For example, in a case of rotating the first eccentric gear 6 in the forward direction and rotating the second eccentric gear 7 in the reverse direction, the number of teeth $z_{1A}$ of the first gear 4, the number of teeth $z_{1B}$ is of the first eccentric gear 6, the number of teeth $z_{2A}$ of the second gear 5, and the number of teeth $z_{2B}$ of the second eccentric gear 7 are set such that all of the following relational expressions are satisfied:

$$z_{1A}=z_{2A};$$

$$z_{1B}=z_{1A}-1;\text{ and}$$

$$z_{2B}=z_{1A}+1.$$

In addition, the speed reducing ratio R may be increased to a maximum ratio by reducing a difference between the numbers of teeth of the internal gear (i.e., the first gear 4 and the second eccentric gear 7) and the external gear (i.e., the second gear 5 and the first eccentric gear 6) to 1.

Thus, the differential assembly D according to the second example in which the control motor 41 is combined with the differential mechanism 3 may serve as a torque vectoring device. In the differential assembly D shown in FIG. 4, the control torque of the control motor 41 is distributed to the first rotary shaft 1 through the first eccentric gear 6 and to the second rotary shaft 2 through the second eccentric gear 7 while being multiplied. Consequently, the first eccentric gear 6 and the second eccentric gear 7 are rotated in opposite directions. That is, a distribution ratio of the drive torque to the first rotary shaft 1 connected to one of drive wheels and the second rotary shaft 2 connected to the other one of drive wheels can be controlled by changing the control torque generated by the control motor 41.

As described, the differential assembly D according to the present disclosure comprises two sets of internal contact type planetary gear sets, and the speed reducing ratio between the supporting carrier 42 and each of the first eccentric gear 6 and the second eccentric gear 7 can be increased significantly. In the differential assembly D according to the second example, specifically, an absolute value of each of the first speed reducing ratio $R_1$ and the second speed reducing ratio $R_2$ is 20. According to the second example, therefore, the control torque of the control motor 41 can be multiplied by a relatively large factor so that the control motor 41 can be downsized. For this reason, the differential assembly D may serve as a compact differential unit 40 having a simple structure.

According the second example, the differential assembly D is further provided with a mechanism for preventing a passive rotation of the control motor 41.

As described, given that the first rotary shaft 1 and the second rotary shaft 2 rotate in the same direction at the same speed, the differential mechanism 3 is rotated integrally and passively. In this situation, if the control motor 41 is also rotated passively, a power transmitting efficiency of the differential assembly D may be reduced. In order to avoid such passive rotation of the control motor 41, the differential assembly D shown in FIG. 2 is provided with a speed reducing planetary gear set 44 and a speed increasing planetary gear set 45.

The speed reducing planetary gear set 44 is arranged between the control motor 41 and the supporting carrier 42 to multiply the control torque applied to the supporting carrier 42 from the control motor 41. For example, when the differential ring gear 14, the first rotary shaft 1, and the second rotary shaft 2 are rotated integrally, the speed reducing planetary gear set 44 reduces a rotational speed of the supporting carrier 42 slower than a rotational speed of the output shaft 41*b* of the control motor 41.

Specifically, the speed reducing planetary gear set 44 is a single-pinion planetary gear set formed coaxially with the first rotary shaft 1 and the second rotary shaft 2. The speed reducing planetary gear set 44 comprises a reduction sun gear 44*a*, a reduction ring gear 44*b*, a reduction carrier 44*c*, and a planetary gear 44*d*.

The reduction sun gear 44*a* is formed around a leading end of the hollow output shaft 41*b* of the control motor 41 supported by the case 12 in a rotatable manner so that the reduction sun gear 44*a* is rotated integrally with the output shaft 41*b*.

The reduction ring gear 44*b* as an internal gear is meshed with the planetary gear 44*d* while being supported by the case 12 in a rotatable manner. Specifically, the reduction ring gear 44*b* is connected to an after-mentioned speed increasing ring gear 45*b* of the speed increasing planetary gear set 45 to be rotated integrally with the speed increasing ring gear 45*b*.

The reduction carrier 44*c* supports the planetary gear 44*d* in a rotatable manner. Specifically, the reduction carrier 44*c* is joined to the supporting carrier 42 of the differential assembly D so that the reduction carrier 44*c* is rotated integrally with the supporting carrier 42. As explained later, when the differential ring gear 14, the first rotary shaft 1, and the second rotary shaft 2 rotate integrally, a rotational speed of the reduction carrier 44*c* is reduced lower than a rotational speed of the reduction ring gear 44*b*.

Specifically, when the reduction sun gear 44*a* is rotated by the control torque delivered from the output shaft 41*b*, the reduction ring gear 44*b* serves as a reaction element of the speed reducing planetary gear set 44 so that a rotational speed of the reduction carrier 44*c* is reduced lower than a rotational speed of the reduction sun gear 44*a*. That is, the speed reducing planetary gear set 44 serves as a speed reducing mechanism of the control motor 41 so that the control torque of the control motor 41 is delivered to the supporting carrier 42 while being multiplied by the speed reducing planetary gear set 44.

As indicated in FIG. 4, the number of teeth of the reduction sun gear 44*a* is 24, the number of teeth of the reduction ring gear 44*b* is 64, and the number of teeth of the planetary gear 44*d* is 20. Accordingly, a speed reducing ratio of the speed reducing planetary gear set 44 is 3.67. Therefore, based on the fact that the speed reducing ratio R of the differential assembly D shown in FIG. 1 (i.e., the first speed reducing ratio $R_1$ and the second speed reducing ratio $R_2$) is ±20, an actual speed reducing ratio R' of the differential assembly D shown in FIG. 4 taking into account the speed reducing ratio of the speed reducing planetary gear set 44 is:

$$R'=\pm 20\cdot 3.67=\pm 73.33.$$

Thus, the speed reducing ratio of the differential assembly D shown in FIG. 1 is multiplied by the speed reducing planetary gear set 44.

The speed increasing planetary gear set 45 is also a single-pinion planetary gear set arranged coaxially with the first rotary shaft 1 and the second rotary shaft 2. The speed increasing planetary gear set 45 comprises a speed increasing sun gear 45a, the speed increasing ring gear 45b, a speed increasing carrier 45c, and a planetary gear 45d.

The speed increasing sun gear 45a may be formed around a hollow shaft that is not allowed to rotate. For example, the speed increasing sun gear 45a is fitted onto a flange (not shown) formed integrally with the case 12. That is, the speed increasing sun gear 45a is not allowed to rotate.

The speed increasing ring gear 45b as an internal gear is meshed with the planetary gear 45d while being supported by the case 12 in a rotatable manner together with the reduction ring gear 44b. As described, the speed increasing ring gear 45b is connected to the reduction ring gear 44b so that the speed increasing ring gear 45b is rotated integrally with the reduction ring gear 44b. When the speed increasing carrier 45c is rotated, a rotational speed of the speed increasing ring gear 45b is increased higher than a rotational speed of the speed increasing carrier 45c.

The speed increasing carrier 45c supports the planetary gear 45d in a rotatable manner. Specifically, the speed increasing carrier 45c is connected to the drive input member 13 and the differential ring gear 14 through a connection member 46 covering the differential mechanism 3 so that the speed increasing carrier 45c is rotated integrally with the drive input member 13 and the differential ring gear 14.

Specifically, when the speed increasing carrier 45c is rotated by the torque delivered from the differential ring gear 14, the speed increasing sun gear 45a serves as a reaction element of the speed increasing planetary gear set 45 so that a rotational speed of the speed increasing ring gear 45b is increased higher than a rotational speed of the speed increasing carrier 45c. Thus, the speed increasing planetary gear set 45 serves as a speed increasing mechanism.

As indicated in FIG. 4, the number of teeth of the speed increasing sun gear 45a is 24, the number of teeth of the speed increasing ring gear 45b is 64, and the number of teeth of the planetary gear 45d is 20. Thus, the number of teeth of the speed increasing sun gear 45a is equal to that of the reduction sun gear 44a, the number of teeth of the speed increasing ring gear 45b is equal to that of the reduction ring gear 44b, and the number of teeth of the planetary gear 45d is equal to that of the planetary gear 44d. Accordingly, a gear ratio (or speed ratio) of the speed increasing planetary gear set 45 is equal to that of the speed reducing planetary gear set 44.

As described, when the first rotary shaft 1 and the second rotary shaft 2 rotate in the same direction at the same speed, the differential assembly D shown in FIG. 4 is rotated integrally and passively. Consequently, the speed increasing carrier 45c of the speed increasing planetary gear set 45 and the reduction carrier 44c of the speed reducing planetary gear set 44 are rotated in the same direction at the same speed. In this situation, the speed increasing planetary gear set 45 in which the speed increasing sun gear 45a is fixed serves as a speed increasing mechanism to increase a rotational speed of the speed increasing ring gear 45b higher than a rotational speed of the speed increasing carrier 45c. On the other hand, the speed reducing planetary gear set 44 serves as a speed reducing mechanism to reduce a rotational speed of the reduction carrier 44c lower than a rotational speed of the reduction ring gear 44b. As described, since the speed increasing carrier 45c and the reduction carrier 44c are rotated at the same speed, and the reduction ring gear 44b and the speed increasing ring gear 45b are connected to each other, the reduction ring gear 44b and the speed increasing ring gear 45b are also rotated at the same speed. Consequently, an absolute value of the speed increasing ratio of the speed increasing planetary gear set 45 and an absolute value of the speed reducing ratio of the speed reducing planetary gear set 44 are equalized to each other. In this situation, since a rotational speed of the speed increasing sun gear 45a is zero, the rotational speed of the reduction sun gear 44a is reduced to substantially zero that is lower than the rotational speed of the reduction ring gear 44b, in accordance with the gear ratio of the speed reducing planetary gear set 44. That is, since the gear ratio of the speed increasing planetary gear set 45 and the gear ratio of the speed reducing planetary gear set 44 are equal to each other, the rotational speed of the reduction sun gear 44a is reduced to substantially zero. Consequently, when the first rotary shaft 1 and the second rotary shaft 2 rotate in the same direction at the same speed so that the differential assembly D shown in FIG. 4 is rotated integrally and passively, a rotational speed of the output shaft 41b of the control motor 41 connected to the reduction sun gear 44a is maintained to zero. That is, a passive rotation of the control motor 41 is prevented.

By thus preventing the passive rotation of the control motor 41, a power transmission efficiency of the differential unit 40 and an energy efficiency of the vehicle can be improved. In addition, since the control motor 41 will not be rotated passively, the differential unit 40 will not be subjected to an inertia torque of the control motor 41 even if the vehicle is accelerated or decelerated abruptly while travelling in a straight line. For this reason, it is not necessary to execute an additional control to generate a cancel torque against the inertia torque of the control motor 41. That is, a torque vectoring control of the differential unit 40 using the control motor 41 can be simplified.

Figure 5:
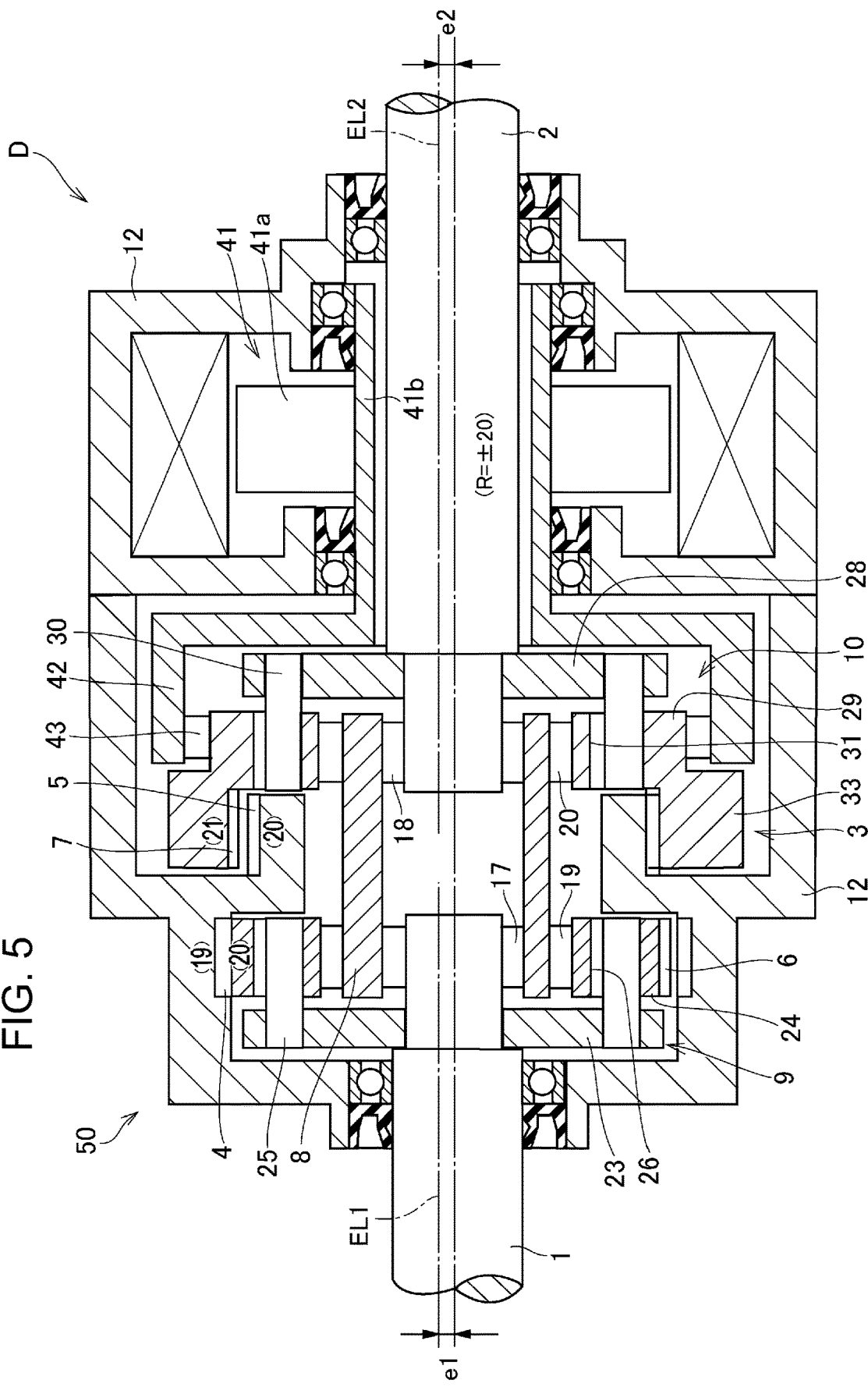
FIG. 5 is a cross-sectional view showing a structure of the differential assembly according to a third example of the present disclosure.

Turning to FIG. 5, there is shown the third example of the differential assembly D as a reversing mechanism 50. According to the third example, the drive input member 13, the speed reducing planetary gear set 44 and the speed increasing planetary gear set 45 are omitted from the differential assembly D shown in FIG. 4.

In the differential assembly D shown in FIG. 5, the output shaft 41b of the control motor 41 is connected directly to the supporting carrier 42, and both of the first gear 4 and the second gear 5 are formed on the case 12. That is, the first gear 4 and the second gear 5 are not allowed to rotate. The first eccentric gear 6 is meshed with the first gear 4, and the second eccentric gear 7 is meshed with the second gear 5. Therefore, when the supporting carrier 42 is rotated by the control torque of the control motor 41 so that the second eccentric gear 7 revolves around the rotational center axis AL, the first gear 4 and the second gear 5 serve as a reaction element. Consequently, the first eccentric gear 6 revolves around the rotational center axis AL in a direction opposite to a revolving direction of the second eccentric gear 7. As a result, a rotational direction of the first rotary shaft 1 is reversed so that the first rotary shaft 1 and the second rotary shaft 2 rotate in opposite directions.

Thus, according to the third example, the differential assembly D serves as the reversing mechanism 50 to rotate the first rotary shaft 1 and the second rotary shaft 2 in opposite directions by the control torque generated by the control motor 41. For example, in order to improve a turning performance of a vehicle, the reversing mechanism 50 may be arranged between driven wheels thereby controlling speeds and torques of the driven wheels while reversing rotational directions of the driven wheels. Otherwise, in order to improve a driving performance and controllability of a four-wheel drive layout vehicle, the reversing mechanism 50 may also be arranged between front wheels and rear wheels to serve as a center differential mechanism for controlling distribution ratio of a torque of the prime mover to the front wheels and the rear wheels.

Figure 6:
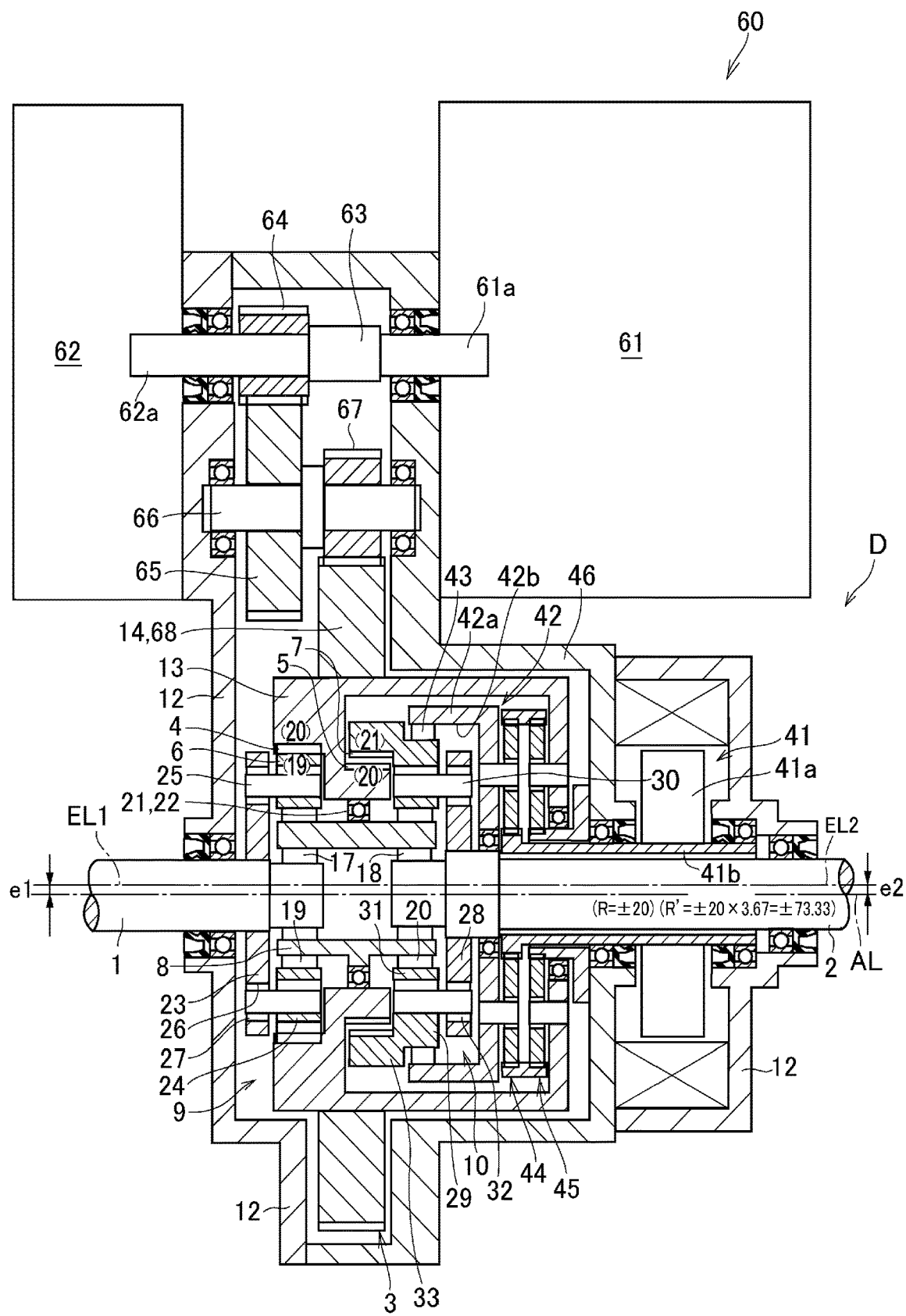
FIG. 6 is a cross-sectional view showing a structure of the differential assembly according to a fourth example of the present disclosure.

Turning to FIG. 6, there is shown the fourth example of the differential assembly D. According to the fourth example, as the first example, the differential assembly D is also combined with the prime mover to serve as a power unit 60 having a torque vectoring function.

The prime mover of the power unit 60 includes a drive motor 61 and a brake device 62. The drive motor 61 generates a drive torque to accelerate the vehicle, and a regenerative torque to decelerate the vehicle. For example, a permanent magnet type synchronous motor or an induction motor may be adopted as the drive motor 61. On the other hand, the brake device 62 generates a regenerative torque as a counter torque to apply a brake force to the vehicle. An output shaft 61a of the drive motor 61 and a rotary shaft 62a of the brake device 62 are connected to each other through a connection shaft 63. For example, the brake device 62 includes: an electromagnetic brake that applies a braking force to a rotary member by electrically generated magnetic attraction; an electric brake that applies a frictional braking force to a rotary member by a feed screw mechanism actuated by a motor; and a regenerative brake that applies a braking force derived from a resistance to a rotary member by regenerating electricity by a motor. Thus, the differential assembly D shown in FIG. 6 is combined with the drive motor assembly having a braking function.

A pinion 64 is mounted on the rotary shaft 62a to be rotated integrally with the connection shaft 63. A counter shaft 66 extends radially inner side of a unit of the output shaft 61a, the connection shaft 63, and the rotary shaft 62a in parallel therewith while being supported by the case 12 in a rotatable manner. A first counter gear 65 is mounted on the counter shaft 66 to be meshed with the pinion 64, and a second counter gear 67 is also mounted on the counter shaft 66. The first counter gear 65, the counter shaft 66, and the second counter gear 67 are rotated entirely integrally. The second counter gear 67 is meshed with differential ring gear 14 serving as an input gear 68 mounted on the drive input member 13 to be rotated integrally with the drive input member 13. In the differential assembly D shown in FIG. 6, accordingly, the input gear 68 serves as the drive input member 13.

The first counter gear 65 is diametrically larger than the pinion 64, and the number of teeth of the first counter gear 65 is larger than the number of teeth of the pinion 64. Whereas, the second counter gear 67 is diametrically smaller than the input gear 68, and the number of teeth of the second counter gear 67 is smaller than the number of teeth of the input gear 68. That is, the pinion 64, the first counter gear 65, the second counter gear 67, and the input gear 68 serve as a reduction gear set to reduce a speed of the input gear 68 slower than a speed of the pinion 64. In other words, a torque of the drive motor 61 or the brake device 62 applied to the connection shaft 63 is delivered to the first gear 4 and the second gear 5 of the differential assembly D while being multiplied by the reduction gear set.

Thus, according to the fourth example, the differential assembly D shown in FIG. 6 is combined with the drive motor 61 and the brake device 62 to serve as the power unit 60 having the torque vectoring function. Here, it is to be noted that any one of the drive motor 61 and the brake device 62 may be omitted. In this case, the power unit 60 serves as a motor drive unit or a brake unit having a torque vectoring function.

Figure 7:
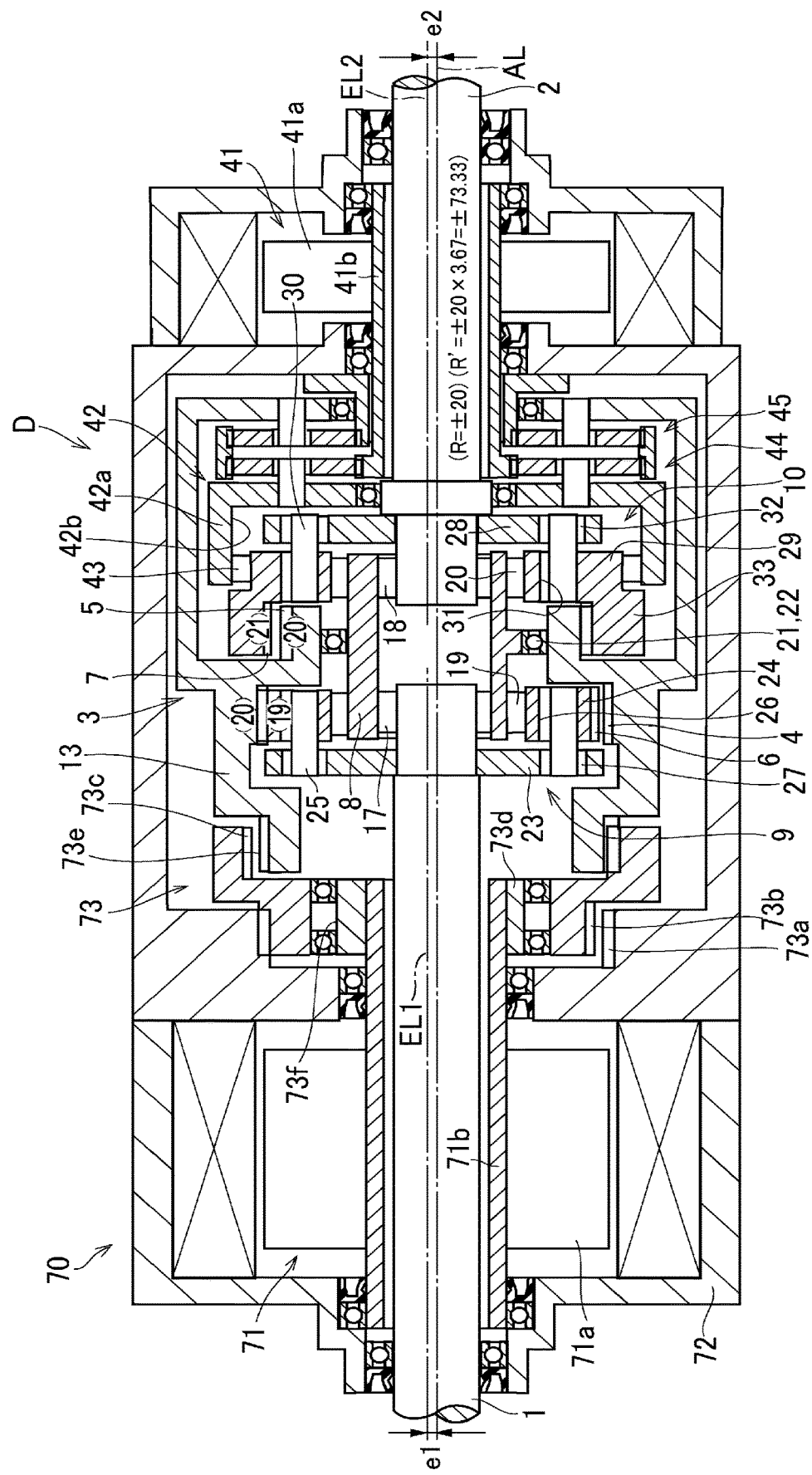
FIG. 7 is a cross-sectional view showing a structure of the differential assembly according a fifth example of the present disclosure.

Turning to FIG. 7, there is shown the fifth example of the differential assembly D. According to the fifth example, the differential assembly D shown in FIG. 7 is adapted to serve as a center differential mechanism 70 that is to be mounted on a four-wheel drive layout vehicle. In the center differential mechanism 70, the first rotary shaft 1 and the second rotary shaft 2 extend coaxially with each other along a longitudinal direction of the vehicle.

The center differential mechanism 70 comprises a drive motor 71 formed around the first rotary shaft 1. The drive motor 71 serves as a prime mover that generates a torque to rotate or brakes the first rotary shaft 1 and the second rotary shaft 2. To this end, for example, a permanent magnet type synchronous motor or an induction motor may be adopted as the drive motor 71.

The drive motor 71 comprises a hollow rotor shaft 71b that is supported by a case 72 in a rotatable manner, and a hollow rotor 71a that is mounted on the rotor shaft 71b. The drive motor 71 is held in the case 72, and the case 72 is joined to the case holding the differential assembly D and the control motor 41. The first rotary shaft 1 penetrates through a hollow space of the rotor shaft 71b while being allowed to rotate relatively with the rotor shaft 71b.

The rotor shaft 71b is connected to the drive input member 13 through a reduction gear set 73 so that an output torque of the drive motor 71 is delivered to the drive input member 13 while being multiplied by the reduction gear set 73. Specifically, the reduction gear set 73 is an internal contact type planetary gear set having a two-stage gear. The reduction gear set 73 comprises a fixed ring gear 73a, an external ring gear 73b, an output ring gear 73c, an eccentric ring gear 73d, and an input ring gear 73e. Those ring gears 73a, 73b, 73c, and 73d are arranged coaxially around the rotational center axis AL.

The fixed ring gear 73a as an internal gear is formed on or attached fixedly to an inner circumferential surface of the case 72 so as to serve as a reaction element of the reduction gear set 73.

The external ring gear 73b is meshed with the fixed ring gear 73a from radially inner side. That is, the fixed ring gear 73a and the external ring gear 73b serve as an internal contact type planetary gear set.

The output ring gear 73c as an internal gear is formed integrally with the external ring gear 73b to be rotated integrally with the external ring gear 73b. That is, the external ring gear 73b and the output ring gear 73c serve as a two-stage gear having external teeth and internal teeth.

The eccentric ring gear 73d as a cylindrical member is fitted onto the rotor shaft 71b of the drive motor 71. An outer circumferential surface 73f of the eccentric ring gear 73d has a circular cross-section around a predetermined eccentric axis (not shown) which is offset from the rotational center axis AL. The two-stage gear as a unit of the external ring gear 73b and the output ring gear 73c is fitted onto the eccentric ring gear 73d through a bearing. That is, the eccentric ring gear 73d rotates around the rotational center axis AL while supporting revolving motions of the external ring gear 73b and the output ring gear 73c around the rotational center axis AL.

The input ring gear 73e as an external gear is connected to the drive input member 13, and is meshed with the output ring gear 73c from radially inner side. That is, the output ring gear 73c and the input ring gear 73e serve as an internal contact type planetary gear set.

In the reduction gear set 73, a rotational (i.e., revolving) speed of the unit of the external ring gear 73b and the output ring gear 73c is reduced slower than a rotational speed of the eccentric ring gear 73d by the internal contact type planetary gear set formed of the fixed ring gear 73a and the external ring gear 73b. In addition, a revolving motion of the unit of the external ring gear 73b and the output ring gear 73c around the rotational center axis AL is translated into a rotary motion around the rotational center axis AL by the internal contact type planetary gear set formed of the output ring gear 73c and the input ring gear 73e.

When the torque of the drive motor 71 is delivered to the eccentric ring gear 73d, the fixed ring gear 73a serves as a reaction element of the reduction gear set 73 so that a rotational speed of the rotor shaft 71b of the drive motor 71 is reduced. That is, the torque of the drive motor 71 is delivered to the drive input member 13 while being multiplied by the reduction gear set 73.

Thus, according to the fifth example, the differential assembly D shown in FIG. 7 may be arranged coaxially with the drive motor 71 to serve as the center differential mechanism 70. As described, the center differential mechanism 70 may be mounted on a four-wheel drive layout vehicle to serve as a compact power unit having a torque vectoring function.

Figure 8:
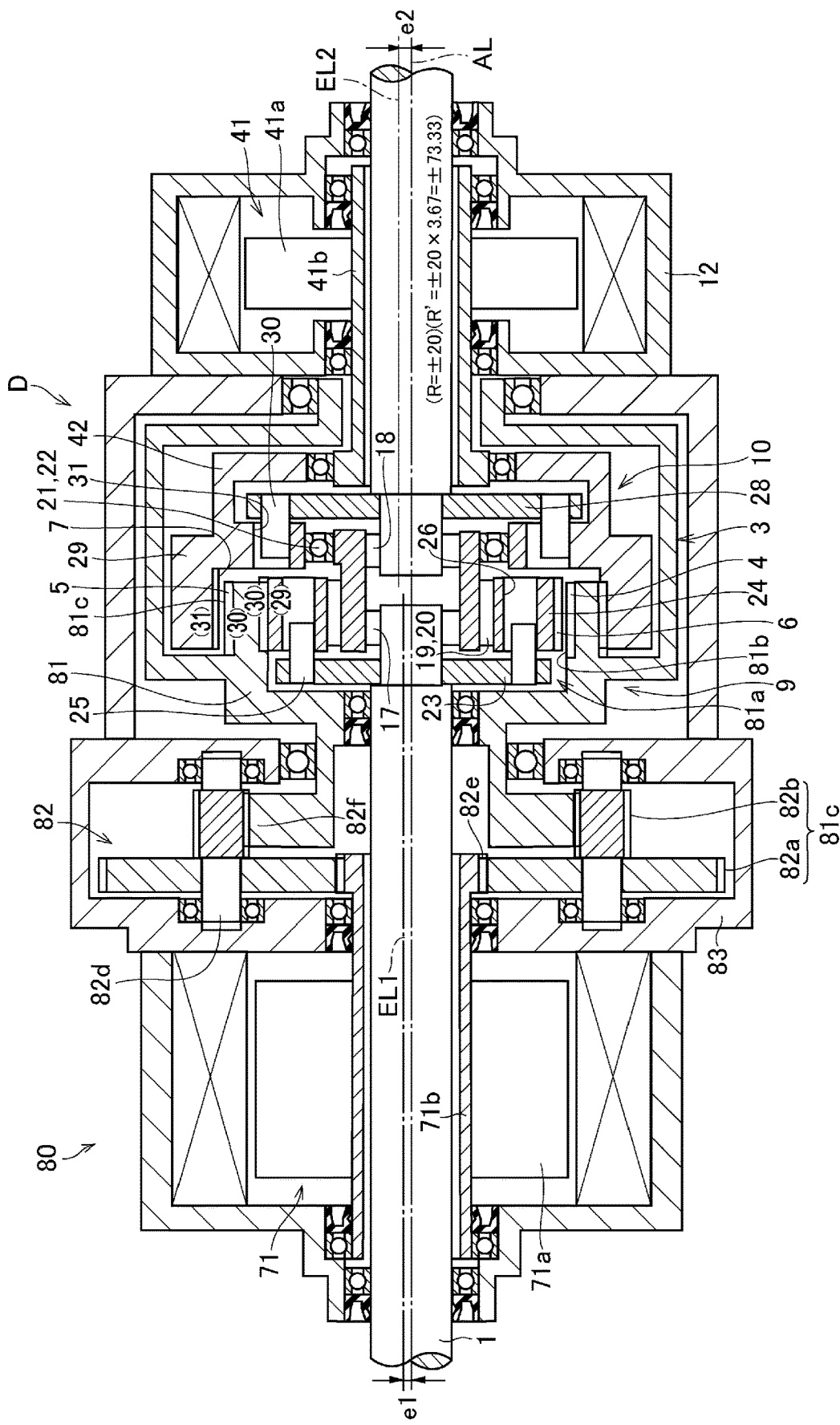
FIG. 8 is a cross-sectional view showing a structure of the differential assembly according a sixth example of the present disclosure.

Turning to FIG. 8, there is shown the sixth example of the differential assembly D. According to the sixth example, the differential assembly D shown in FIG. 8 is adapted to serve as a center differential mechanism 80 that is also to be mounted on a four-wheel drive layout vehicle. In the center differential mechanism 80, the first rotary shaft 1 and the second rotary shaft 2 extend coaxially with each other along a longitudinal direction of the vehicle.

In the differential assembly D, the first eccentric plate 24, the first eccentric gear 6, the second eccentric plate 29, the second eccentric gear 7, the first gear 4, and the second gear 5 are arranged in parallel in a radial direction so as to downsize the differential assembly D in the axial direction.

The differential assembly D shown in FIG. 8 comprises a dual teeth eccentric member 81 as a cylindrical rotary member formed around the rotational center axis AL. The dual teeth eccentric member 81 comprises a hollow portion 81a formed around the first eccentric axis EL 1. In the hollow portion 81a, the first gear 4 is formed on an inner circumferential surface 81b, and the second gear 5 is formed on an outer circumferential surface 81c.

According to the sixth example, the first eccentric axis EL1 and the second eccentric axis EL2 are offset from each other. That is, an amount of eccentricity e1 of the first eccentric axis EL1 from the rotational center axis AL and an amount of eccentricity e2 of the second eccentric axis EL2 from the rotational center axis AL are different from each other. Specifically, the amount of eccentricity e2 is larger than the amount of eccentricity e1.

The first eccentric gear 6 is meshed with the first gear 4 formed on the dual teeth eccentric member 81, and the second eccentric gear 7 is meshed with the second gear 5 formed on the dual teeth eccentric member 81. Thus, in the differential assembly D shown in FIG. 8, the first eccentric plate 24 on which the first eccentric gear 6 is formed, the second eccentric plate 29 on which the second eccentric gear 7 is formed, and the dual teeth eccentric member 81 on which the first gear 4 and the second gear 5 are formed are arranged in parallel to one another in the radial direction. In other words, the first eccentric plate 24 on which the first eccentric gear 6 is formed, the second eccentric plate 29 on which the second eccentric gear 7 is formed, and the dual teeth eccentric member 81 on which the first gear 4 and the second gear 5 are formed are overlapped to one another in the axial direction. According to the sixth example, therefore, the differential assembly D may be downsized in the axial direction.

Optionally, in order to avoid passive rotation of the control motor 41, the differential assembly D shown in FIG. 8 may be combined with the speed reducing planetary gear set 44 and the speed increasing planetary gear set 45 shown in FIG. 7.

In the differential assembly D shown in FIG. 8, a reduction gear set 82 is employed instead of the reduction gear set 73 shown in FIG. 7. The reduction gear set 82 comprises: a planetary gear 82c having a diametrically larger gear 82a and a diametrically smaller pinion 82b formed integrally; a carrier 82d that is fixed to a case 83 while supporting the planetary gear 82c; an input sun gear 82e that is rotated integrally with the rotor shaft 71b of the drive motor 71 while being meshed with the diametrically larger gear 82a; and an output sun gear 82f that is rotated integrally with the drive input member 13 while being meshed with the diametrically smaller pinion 82b. In the differential assembly D shown in FIG. 8, the drive torque generated by the drive motor 71 is delivered to the drive input member 13 while being multiplied by the reduction gear set 82. In addition, In the differential assembly D shown in FIG. 8, the reduction gear set 73 shown in FIG. 7 may also be employed instead of the reduction gear set 82.

Figure 9:
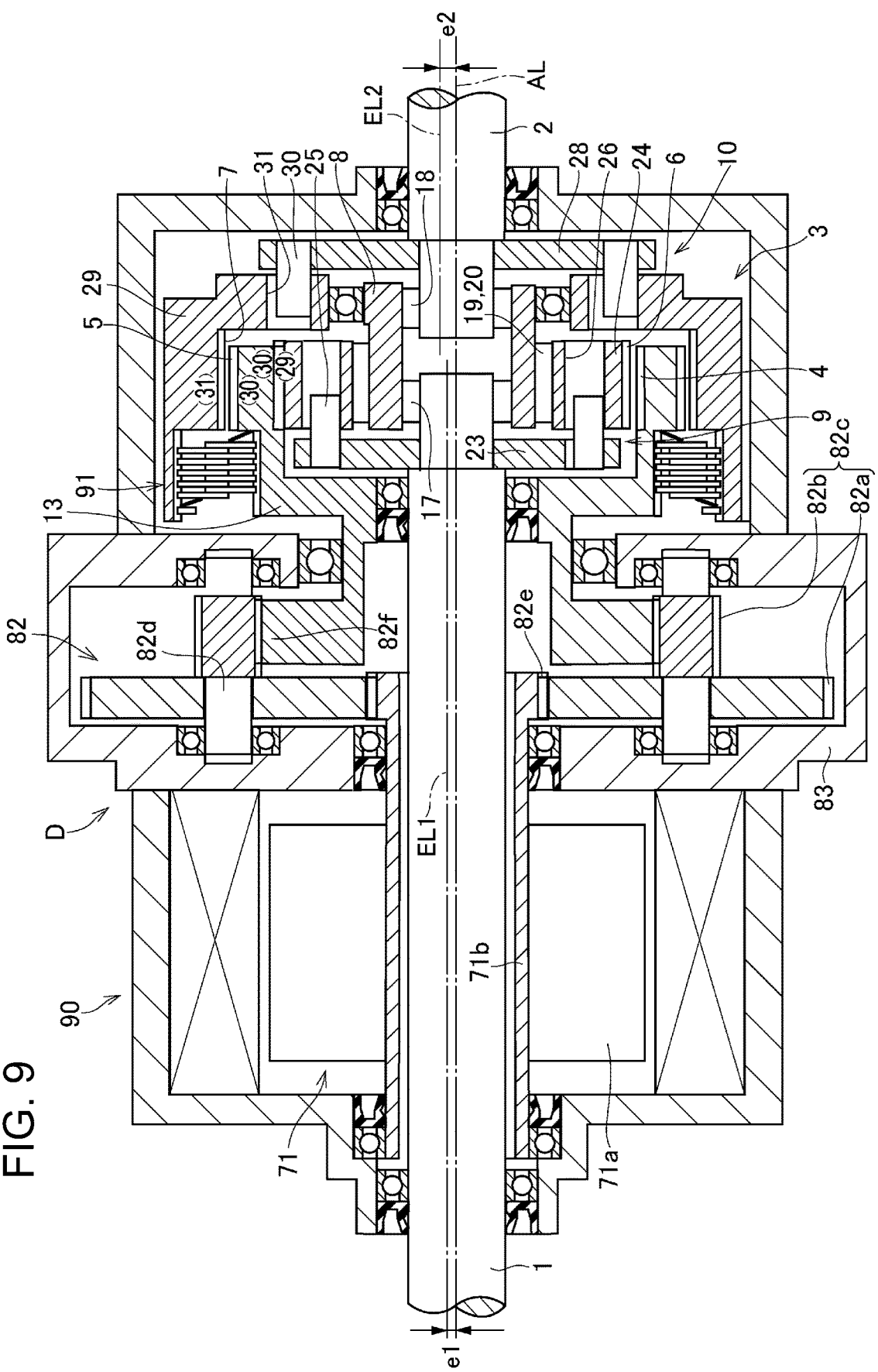
FIG. 9 is a cross-sectional view showing a structure of the differential assembly according a seventh example of the present disclosure.

Turning to FIG. 9, there is shown the seventh example of the differential assembly D. According to the seventh example, the differential assembly D shown in FIG. 9 is adapted to serve as a center differential mechanism 90 that is to be mounted on a four-wheel drive layout vehicle. In the center differential mechanism 90, the first rotary shaft 1 and the second rotary shaft 2 also extend coaxially with each other while being opposed to each other in the longitudinal direction of the vehicle.

In the differential assembly D shown in FIG. 9, a clutch 91 is employed instead of the control motor 41 to restrict a differential rotation between the first rotary shaft 1 and the second rotary shaft 2. The clutch 91 is an engagement device that selectively engage the drive input member 13 with the second eccentric gear 7. Specifically, when the clutch 91 is engaged the drive input member 13 is rotated integrally with the second eccentric gear 7. For example, a frictional clutch and a dog clutch may be adopted as the clutch 91. According to the seventh example, a multiple-plate friction clutch is adopted as the clutch 91. Here, the clutch 91 may also be arranged in the differential assembly D shown in FIG. 8.

Thus, in the differential assembly D shown in FIG. 9, the differential rotation between the first rotary shaft 1 and the second rotary shaft 2 may be restricted by engaging the drive input member 13 with the second eccentric gear 7 by the clutch 91. That is, according to the seventh example, the differential assembly D has a differential lock function. According to the seventh example, therefore, a driving performance and a control stability of the vehicle on which the differential assembly D is mounted can be improved.

In the examples shown in FIGS. 10 to 14, the two-stage gear and the internal contact type planetary gear set serve as the motion translating mechanism.

Figure 10:
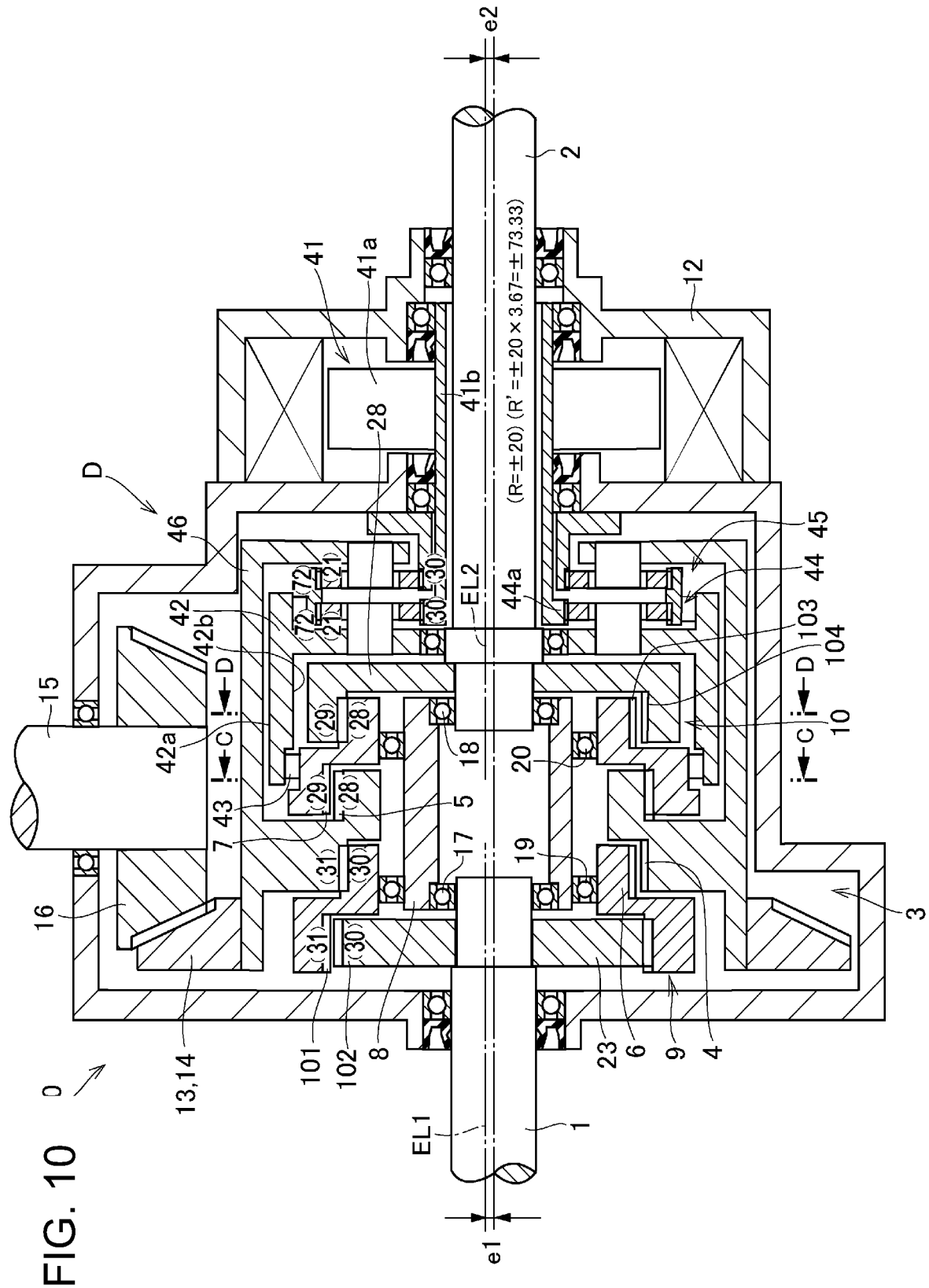
FIG. 10 is a cross-sectional view showing a structure of the differential assembly according an eighth example of the present disclosure.
Figure 11:
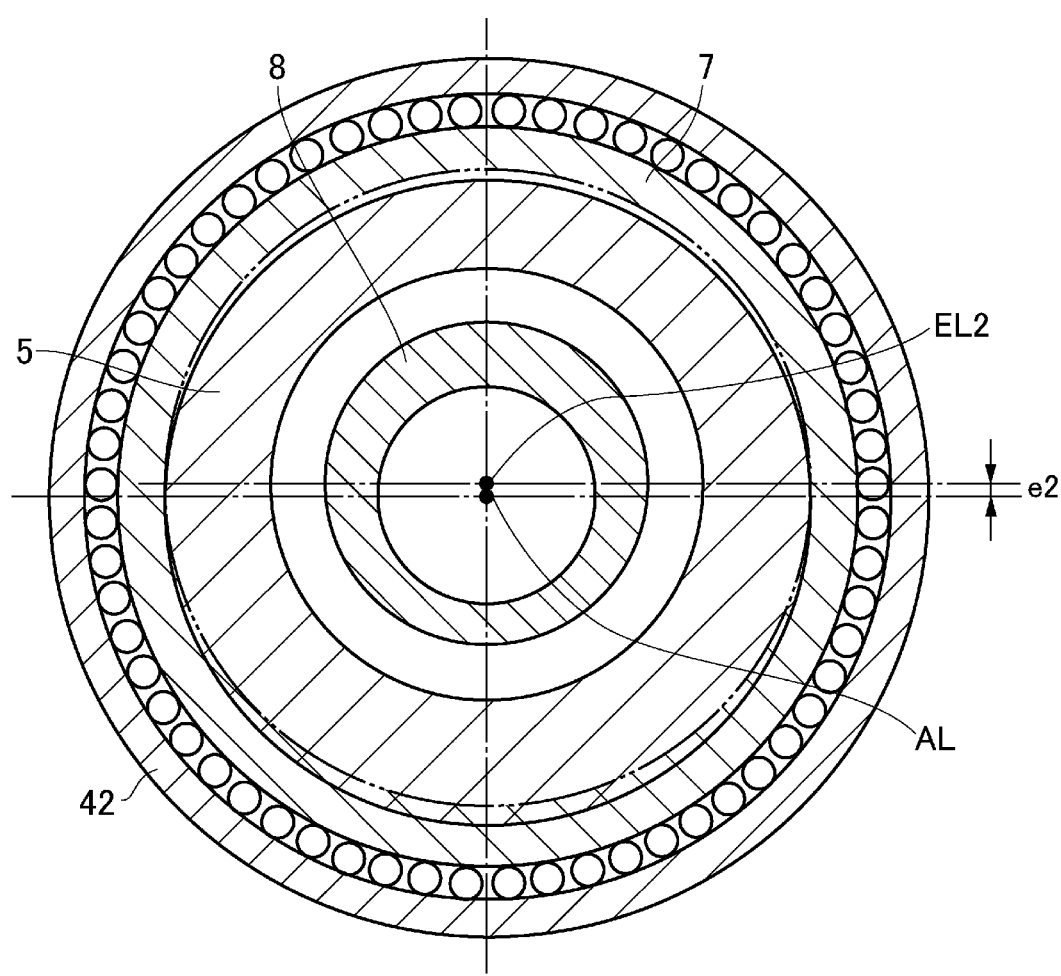
FIG. 11 is a cross-sectional view showing a cross-section of the differential assembly according to the eighth example along C-C line in FIG. 10.
Figure 12:
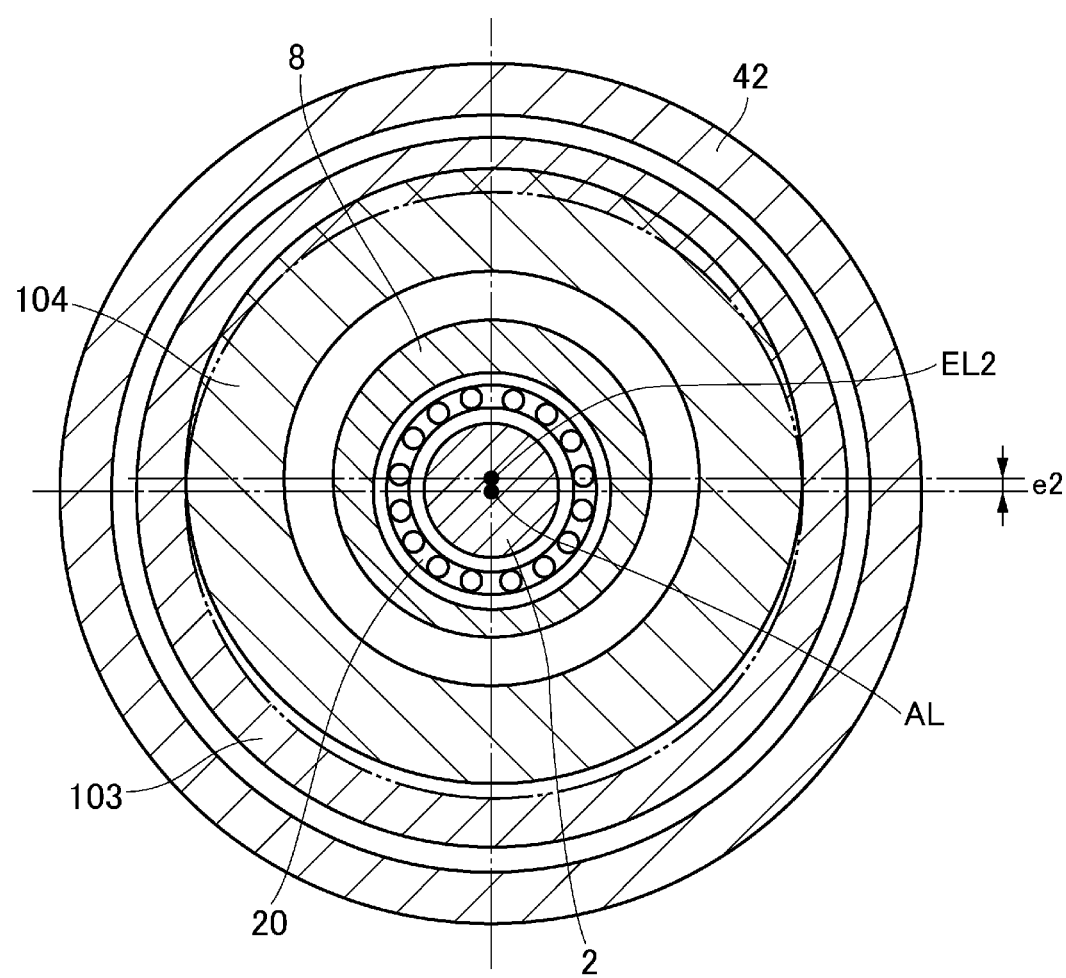
FIG. 12 is a cross-sectional view showing a cross-section of the differential assembly according to the eighth example along D-D line in FIG. 10.

Turning to FIG. 10, there is shown the eighth example of the differential assembly D. According to the eighth example, as the second example, the differential assembly D is also combined with the control motor 41 to serve as a differential unit 100 having a torque vectoring function. According to the eighth example, the first motion translating mechanism 9 comprises a first output eccentric gear 101 and a first output gear 102. A cross-section of the differential assembly D according to the eighth example along C-C line in FIG. 10 is shown in FIG. 11, and a cross-section of the differential assembly D according to the eighth example along D-D line in FIG. 10 is shown in FIG. 12.

The first output eccentric gear 101 as an internal gear is formed integrally with the first eccentric gear 6 as an external gear to be rotated integrally with the first eccentric gear 6. Specifically, the first output eccentric gear 101 is offset upwardly in FIG. 10 from the rotational center axis AL in the amount of eccentricity e1. That is, the first output eccentric gear 101 is formed around the first eccentric axis EL1 in such a manner as to rotate around the first eccentric axis EL1 and revolve around the rotational center axis AL. Thus, the first output eccentric gear 101 and the first eccentric gear 6 serve as a two-stage gear having external teeth and internal teeth.

The first output gear 102 as an external gear is mounted on the first rotary shaft 1 to be rotated integrally with the first rotary shaft 1, and is meshed with the first output eccentric gear 101 from radially inner side. That is, the first output eccentric gear 101 and the first output gear 102 serve as an internal contact type planetary gear set (as will be referred to as the third internal contact type planetary gear set). As illustrated in FIG. 10, an engagement site between the first output eccentric gear 101 and the first output gear 102 is out of phase with an engagement site between the first gear 4 and the first eccentric gear 6 by 180 degrees, on an orbital path of the two-stage gear formed of the first output eccentric gear 101 and the first eccentric gear 6.

That is, in the differential assembly D shown in FIG. 10, a revolving motion of the two-stage gear formed of the first output eccentric gear 101 and the first eccentric gear 6 around the rotational center axis AL is translated into a rotary motion of the first rotary shaft 1 around the rotational center axis AL by the first motion translating mechanism 9. Otherwise, the rotary motion of the first rotary shaft 1 around the rotational center axis AL is translated into the revolving motion of the two-stage gear formed of the first output eccentric gear 101 and the first eccentric gear 6 around the rotational center axis AL by the first motion translating mechanism 9.

On the other hand, the second motion translating mechanism 10 comprises a second output eccentric gear 103 and a second output gear 104.

The second output eccentric gear 103 as an external gear is formed integrally with the second eccentric gear 7 as an internal gear to be rotated integrally with the second eccentric gear 7. Specifically, the second output eccentric gear 103 is offset upwardly in FIG. 10 from the rotational center axis AL in the amount of eccentricity e2. That is, the second output eccentric gear 103 is formed around the second eccentric axis EL2 in such a manner as to rotate around the second eccentric axis EL2 and revolve around the rotational center axis AL. Thus, the second output eccentric gear 103 and the second eccentric gear 7 also serve as a two-stage gear having external teeth and internal teeth.

The second output gear 104 as an internal gear is connected to the second rotary shaft 2 to be rotated integrally with the second rotary shaft 2, and is meshed with the second output eccentric gear 103 from radially inner side. That is, the second output eccentric gear 103 and the second output gear 104 serve as an internal contact type planetary gear set (as will be referred to as the fourth internal contact type planetary gear set). As illustrated in FIG. 10, an engagement site between the second output eccentric gear 103 and the second output gear 104 is out of phase with an engagement site between the second gear 5 and the second eccentric gear 7 by 180 degrees, on an orbital path of the two-stage gear formed of the second output eccentric gear 103 and the second eccentric gear 7.

That is, in the differential assembly D shown in FIG. 10, a revolving motion of the two-stage gear formed of the second output eccentric gear 103 and the second eccentric gear 7 around the rotational center axis AL is translated into a rotary motion of the second rotary shaft 2 around the rotational center axis AL by the second motion translating mechanism 10. Otherwise, the rotary motion of the second rotary shaft 2 around the rotational center axis AL is translated into the revolving motion of the two-stage gear formed of the second output eccentric gear 103 and the second eccentric gear 7 around the rotational center axis AL by the second motion translating mechanism 10.

Thus, in the differential assembly D shown in FIG. 10, the first rotary shaft 1, the second rotary shaft 2, and the differential mechanism 3, the first motion translating mechanism 9, and the second motion translating mechanism 10 serve as the differential unit 100. In the differential unit 100, a drive torque generated by the prime mover is applied to the drive input member 13, and distributed to the first rotary shaft 1 and the second rotary shaft 2. Specifically, the drive torque is distributed to the first eccentric gear 6 though the first gear 4 and to the second eccentric gear 7 through the second gear 5. Then, the drive torque is further delivered from the first eccentric gear 6 to the first rotary shaft 1 through the first motion translating mechanism 9, and from the second eccentric gear 7 to the second rotary shaft 2 through the second motion translating mechanism 10. For example, given that the first rotary shaft 1 and the second rotary shaft 2 are rotated at a same speed in a same direction, the first rotary shaft 1, the second rotary shaft 2, and the differential mechanism 3 are rotated integrally. In this case, the drive torque is distributed equally to the first rotary shaft 1 and the second rotary shaft 2. By contrast, given that the first rotary shaft 1 and the second rotary shaft 2 are rotated at different speeds, the first rotary shaft 1 and the second rotary shaft 2 are rotated differentially in opposite directions.

In order to allow the first rotary shaft 1 and the second rotary shaft 2 to rotate in opposite directions, according to the eighth example, the first gear ratio $u_{11}$ between the first gear 4 and the first eccentric gear 6, and the second gear ratio $u_{12}$ between the second gear 5 and the second eccentric gear 7 are set to different values.

According to the eighth example, the number of teeth $z_{1A}$ of the first gear 4 is 31, the number of teeth $z_{2A}$ of the second gear 5 is 28, the number of teeth $z_{1B}$ of the first eccentric gear 6 is 30, and the number of teeth $z_{2B}$ of the second eccentric gear 7 is 29. Accordingly, the first gear ratio $u_{11}$ may be expressed as:

$$u_{11}=z_{1B}/z_{1A}=30/31≈0.9677;\ \text{and}$$

the second gear ratio $u_{12}$ may be expressed as:

$$u_{12}=z_{2A}/z_{2B}=28/29≈0.9655.$$

As described, the number of teeth $z_{1B}$ of the first eccentric gear 6 is one less than the number of teeth $z_{1A}$ of the first gear 4, and the number of teeth $z_{2B}$ of the second eccentric gear 7 is one more than the number of teeth $z_{2A}$ of the second gear 5. For these reasons, the first gear ratio $u_{11}$ and the second gear ratio $u_{12}$ are slightly different from each other.

As described, in the differential assembly D according to the present disclosure, the first internal contact type planetary gear set is combined with the second internal contact type planetary gear set to serve as the differential mechanism 3. In addition, according to the eighth example, the third internal contact type planetary gear set formed of the first output eccentric gear 101 and the first output gear 102 serves as the first motion translating mechanism 9, and the fourth internal contact type planetary gear set formed of the second output eccentric gear 103 and the second output gear 104 serves as the second motion translating mechanism 10. That is, the differential assembly D shown in FIG. 8 comprises: a first complex planetary gear set formed by combining the first internal contact type planetary gear set with the third internal contact type planetary gear set; and a second complex planetary gear set formed by combining the second internal contact type planetary gear set with the fourth internal contact type planetary gear set. In the first complex planetary gear set thus structured, the first gear ratio $u_{11}$ and the second gear ratio $u_{12}$ are slightly different from each other. Given that the first gear ratio $u_{11}$ and the second gear ratio $u_{12}$ are equal to each other, a speed reducing ratio of each of the first and second complex planetary gear sets (i.e., a speed ratio of an output element to an input element) would reach an infinite value. Specifically, an inverse number of a ratio of a speed of the first output gear 102 to a speed of the drive input member 13 would reach an infinite value, and an inverse number of a ratio of a speed of the second output gear 104 to the speed of the drive input member 13 would reach an infinite value. In this case, the first complex planetary gear set and the second complex planetary gear set would not function properly. Whereas, since the first gear ratio $u_{11}$ and the second gear ratio $u_{12}$ are set to different values, the speed reducing ratios of the first complex planetary gear set and the second complex planetary gear set can be increased without reaching the infinite value. For example, the speed reducing ratio of the differential assembly D may be reduced by increasing the difference between the first gear ratio $u_{11}$ and the second gear ratio $u_{12}$. By contrast, the speed reducing ratio of the differential assembly D may be increased by reducing the difference between the first gear ratio $u_{11}$ and the second gear ratio $u_{12}$.

As described, in the differential assembly D serving as the differential unit 100, the drive torque applied to the drive input member 13 is distributed to the first output gear 102 and the second output gear 104. In this situation, if the first rotary shaft 1 and the second rotary shaft 2 are rotated at a same speed, the first output gear 102 and the second output gear 104 are rotated integrally.

As also described, the first gear ratio $u_{11}$ and the second gear ratio $u_{12}$ are set to different values. Therefore, when the first gear 4 and the second gear 5 are rotated, the first output gear 102 is rotated slower than a rotational speed of the second output gear 104 due to the fact that the first gear ratio $u_{11}$ is greater than the second gear ratio $u_{12}$. In other words, the second output gear 104 is rotated faster than a rotational speed of the first output gear 102 due to the fact that the second gear ratio $u_{12}$ is smaller than the first gear ratio $u_{11}$. Consequently, the first output gear 105 and the second output gear 104 are rotated in opposite directions. In this situation, given that the first rotary shaft 1 and the second rotary shaft 2 are rotated at the same speed, the first eccentric gear 6 revolves along the first gear 4 around the rotational center axis AL, and the first output eccentric gear 101 revolves around the first output gear 102 and the rotational center axis AL. On the other hand, the second eccentric gear 7 revolves around the second gear 5 and the rotational center axis AL, and the second output eccentric gear 103 revolves around the second output gear 104 and the rotational center axis AL. Therefore, torques are applied to an engagement site between the first gear 4 and the first eccentric gear 6, and to an engagement site between the second gear 5 and the second eccentric gear 7 in opposite directions thereby causing interference between those engagement sites. Likewise, torques are applied to an engagement site between the first output eccentric gear 101 and the first output gear 102, and to an engagement site between the second output eccentric gear 103 and the second output gear 104 in opposite directions thereby causing interference between those engagement sites. As a result, the differential assembly D is substantially brought into engagement to rotate integrally so that the first rotary shaft 1 and the second rotary shaft 2 are rotated integrally without rotating relatively to each other.

By contrast, given that the first rotary shaft 1 and the second rotary shaft 2 are rotated at different speeds so that the first output gear 102 and the second output gear 104 are rotated in a differential manner, the differential assembly D will not be brought into engagement by such interference between the above-mentioned engagement sites. In this case, the drive torque is distributed from the drive input member 13 to the first output gear 102 and to the second output gear 104 while rotating the first output gear 102 and the second output gear 104 relatively to each other. Consequently, torques are applied to the engagement site between the first output eccentric gear 101 and the first output gear 102 and to the engagement site between the second output eccentric gear 103 and the second output gear 104 in opposite directions thereby rotating the first output gear 102 and the second output gear 104 in opposite directions. That is, the rotational direction of the second output gear 104 is reversed to the opposite direction to the rotational direction of the first output gear 102. As a result, the first rotary shaft 1 and the second rotary shaft 2 are rotated differentially in opposite directions.

Thus, according to the eighth example, the differential assembly D comprises four sets of the internal contact type planetary gear sets. In the differential assembly D shown in FIG. 10, the drive torque delivered from the prime mover is distributed to the first rotary shaft 1 and the second rotary shaft, and a speed difference between the first rotary shaft 1 and the second rotary shaft 2 is absorbed by the differential mechanism 3. For this reason, the differential assembly D shown in FIG. 10 may serve as a compact differential unit 100 having a simple structure.

As also described, the control torque of the control motor 41 is applied to the supporting carrier 42. The control torque delivered to the supporting carrier 42 is delivered to the first eccentric gear 6 and the second eccentric gear 7 while being multiplied, and further delivered to the first rotary shaft 1 and the second rotary shaft 2. Consequently, the first rotary shaft 1 and the second rotary shaft 2 are rotated in a differential manner in opposite directions.

According to the eighth example, a speed reducing ratio between the supporting carrier 42 and the first output gear 102 is referred to as a first speed reducing ratio, and a speed reducing ratio between the supporting carrier 42 and the second output gear 104 is referred to as a second speed reducing ratio. In the differential assembly D according to the eighth example, the first speed reducing ratio and the second speed reducing ratio are equal or approximated to each other. In other words, the first speed reducing ratio is an inverse number of a ratio of a rotational speed of the first output gear 102 to a rotational speed of the supporting carrier 42, and the second speed reducing ratio is an inverse number of a ratio of a rotational speed of the second output gear 104 to a rotational speed of the supporting carrier 42.

In the differential assembly D according to the eighth example, rotational speeds of both of the first output gear 102 and the second output gear 104 are reduced with respect to a rotational speed of the supporting carrier 42. That is, an absolute value of each of the first speed reducing ratio and the second speed reducing ratio is individually greater than 1. In the differential assembly D according to the eighth example, therefore, the control torque applied to the supporting carrier 42 from the control motor 41 is delivered to the first output gear 102 and the second output gear 104 while being multiplied.

As described, in the differential assembly D shown in FIG. 10, the number of teeth $z_{1A}$ of the first gear 4 is 31, the number of teeth $z_{1B}$ of the first eccentric gear 6 is 30, the number of teeth $z_{2A}$ of the second gear 5 is 28, and the number of teeth $z_{2B}$ of the second eccentric gear 7 is 29. Likewise, the number of teeth $z_{1C}$ of the first output eccentric gear 101 is 31, the number of teeth $z_{1D}$ of the first output gear 102 is 30, the number of teeth $z_{2C}$ of the second output eccentric gear 103 is 28, and the number of teeth $z_{2D}$ of the second output gear 104 is 29. Accordingly, the first speed reducing ratio $R_{11}$ between the supporting carrier and the first output gear 102 may be expressed as:

$$R_{11} = 1/\{1 - (z_{1A}/z_{1D}) \cdot (z_{1C}/z_{1B})\}$$
$$= 1/\{1 - (31/30) \cdot (31/30)\}$$
$$\approx -14.7541.$$

In general, speed reducing ratios achieved by the conventional planetary gear sets falls within a range of approximately 4 to 10. Thus, the first speed reducing ratio $R_{11}$ is greater than the speed reducing ratios of the conventional planetary gear sets. In this case, the first output gear 102 is rotated in the opposite direction to the rotational direction of the supporting carrier 42 as an input member, therefore, the first speed reducing ratio $R_{11}$ is referred to as a negative value (e.g., −14.7541) for the sake of convenience.

Likewise, the second speed reducing ratio $R_{12}$ between the supporting carrier 42 and the second output gear 104 may be expressed as:

$$R_{12} = 1/\{1 - (z_{2A}/z_{2D}) \cdot (z_{2C}/z_{2B})\}$$
$$= 1/\{1 - (28/29) \cdot (28/29)\}$$
$$\approx 14.7544.$$

Thus, the second speed reducing ratio $R_{12}$ is also greater than the speed reducing ratios of the conventional planetary gear sets. In FIG. 10, the speed reducing ratio R of the differential assembly D is indicated commonly as $R=\pm 14.754$.

As indicated in FIG. 10, the number of teeth of the reduction sun gear 44a is 30, the number of teeth of the reduction ring gear 44b is 72, and the number of teeth of the planetary gear 44d is 21. According to the eighth example, therefore, a speed reducing ratio of the speed reducing planetary gear set 44 is 3.4. Accordingly, based on the fact that the speed reducing ratio R of the differential assembly D shown in FIG. 10 (i.e., the first speed reducing ratio $R_{11}$ and the second speed reducing ratio $R_{12}$) is ±14.754, an actual speed reducing ratio R' of the differential assembly D shown in FIG. 10 taking into account the speed reducing ratio of the speed reducing planetary gear set 44 is:

$$R' = \pm 14.754 \cdot 3.4 = \pm 50.164.$$

Thus, the speed reducing ratio of the differential assembly D shown in FIG. 10 is multiplied by the speed reducing planetary gear set 44.

Turning to Table 1, there are shown a relation between the numbers of teeth $z_{1A}$, $z_{1B}$, $z_{1C}$, $z_{1D}$ and the first speed reducing ratio $R_{11}$; a relation between the numbers of teeth $z_{2A}$, $z_{2B}$, $z_{2C}$, $z_{2D}$ and the second speed reducing ratio $R_{12}$; and an error rate between the first speed reducing ratio $R_{11}$ and the second speed reducing ratio $R_{12}$.

TABLE 1

| REVERSE(LEFT) | | | | | FORWARD(RIGHT) | | | | | ERROR RATE BETWEEN |
|---|---|---|---|---|---|---|---|---|---|---|
| TEETH NUMBER | | | | SPEED REDUCING | TEETH NUMBER | | | | SPEED REDUCING | SPEED REDUCING |
| $Z_{1A}$ | $Z_{1B}$ | $Z_{1C}$ | $Z_{1D}$ | RATIO $R_1$ | $Z_{2A}$ | $Z_{2B}$ | $Z_{2C}$ | $Z_{2D}$ | RATIO $R_2$ | RATIOS (%) |
| 11 | 10 | 11 | 10 | −4.7619 | 8 | 9 | 8 | 9 | 4.7647 | 0.05879 |
| 12 | 11 | 12 | 11 | −5.2609 | 9 | 10 | 9 | 10 | 5.2632 | 0.04348 |
| 13 | 12 | 13 | 12 | −5.7600 | 10 | 11 | 10 | 11 | 5.7619 | 0.03306 |
| 14 | 13 | 14 | 13 | −6.2593 | 11 | 12 | 11 | 12 | 6.2609 | 0.02572 |
| 15 | 14 | 15 | 14 | −6.7586 | 12 | 13 | 12 | 13 | 6.7600 | 0.02040 |
| 16 | 15 | 16 | 15 | −7.2581 | 13 | 14 | 13 | 14 | 7.2593 | 0.01646 |
| 17 | 16 | 17 | 16 | −7.7576 | 14 | 15 | 14 | 15 | 7.2586 | 0.01347 |
| 18 | 17 | 18 | 17 | −8.2571 | 15 | 16 | 15 | 16 | 8.2581 | 0.01116 |
| 19 | 18 | 19 | 18 | −8.7568 | 16 | 17 | 16 | 17 | 8.7576 | 0.00935 |
| 20 | 19 | 20 | 19 | −9.2564 | 17 | 18 | 17 | 18 | 9.2571 | 0.00791 |
| 21 | 20 | 21 | 20 | −9.7561 | 18 | 19 | 18 | 19 | 9.7568 | 0.00676 |
| 22 | 21 | 22 | 21 | −10.2558 | 19 | 20 | 19 | 20 | 10.2564 | 0.00581 |
| 23 | 22 | 23 | 22 | −10.7556 | 20 | 21 | 20 | 21 | 10.7561 | 0.00504 |
| 24 | 23 | 24 | 23 | −11.2553 | 21 | 22 | 21 | 22 | 11.2558 | 0.00440 |
| 25 | 24 | 25 | 24 | −11.7551 | 22 | 23 | 22 | 23 | 11.7556 | 0.00386 |
| 26 | 25 | 26 | 25 | −12.2549 | 23 | 24 | 23 | 24 | 12.2553 | 0.00340 |
| 27 | 26 | 27 | 26 | −12.7547 | 24 | 25 | 24 | 25 | 12.7551 | 0.00302 |
| 28 | 27 | 28 | 27 | −13.2545 | 25 | 26 | 25 | 26 | 13.2549 | 0.00269 |
| 29 | 28 | 29 | 28 | −13.7544 | 26 | 27 | 26 | 27 | 13.7547 | 0.00241 |
| 30 | 29 | 30 | 29 | −14.2542 | 27 | 28 | 27 | 28 | 14.2545 | 0.00216 |
| 31 | 30 | 31 | 30 | −14.7541 | 28 | 29 | 28 | 29 | 14.7544 | 0.00195 |
| 32 | 31 | 32 | 31 | −15.2540 | 29 | 30 | 29 | 30 | 15.2542 | 0.00176 |
| 33 | 32 | 33 | 32 | −15.7538 | 30 | 31 | 30 | 31 | 15.7541 | 0.00160 |
| 34 | 33 | 34 | 33 | −16.2527 | 31 | 32 | 31 | 32 | 16.2540 | 0.00146 |

TABLE 1-continued

| REVERSE(LEFT) | | | | | FORWARD(RIGHT) | | | | | ERROR RATE BETWEEN |
|---|---|---|---|---|---|---|---|---|---|---|
| TEETH NUMBER | | | | SPEED REDUCING | TEETH NUMBER | | | | SPEED REDUCING | SPEED REDUCING |
| $z_{1A}$ | $z_{1B}$ | $z_{1C}$ | $z_{1D}$ | RATIO $R_1$ | $z_{2A}$ | $z_{2B}$ | $z_{2C}$ | $z_{2D}$ | RATIO $R_2$ | RATIOS (%) |
| 35 | 34 | 35 | 34 | −16.7536 | 32 | 33 | 32 | 33 | 16.7538 | 0.00133 |
| 36 | 35 | 36 | 35 | −17.2535 | 33 | 34 | 33 | 34 | 17.2537 | 0.00122 |

Thus, in the differential assembly D shown in FIG. 10, the first output gear 102 and the second output gear 104 are rotated differentially in opposite directions by rotating the supporting carrier 42 by the control torque. As described, the first speed reducing ratio $R_{11}$ as the ratio of a rotational speed of the first output gear 102 to a rotational speed of the supporting carrier 42 and the second speed reducing ratio $R_{12}$ as the ratio of a rotational speed of the second output gear 104 to a rotational speed of the supporting carrier 42 are equal or approximated to each other. According to the eighth example, specifically, an error rate between the first speed reducing ratio $R_{11}$ and the second speed reducing ratio $R_{12}$ is 0.0019% as indicated in Table 1. In the differential assembly D shown in FIG. 10, therefore, the control torque generated by the control motor 41 is delivered to the first output gear 102 and the second output gear 104 while being multiplied by substantially same amplification factors.

In the differential assembly D shown in FIG. 10, the supporting carrier 42 as the input element is rotated in the forward direction when the control motor 41 is rotated in the forward direction (i.e., clockwise). In this situation, the first output gear 102 as the output element is rotated in the reverse direction (i.e., counterclockwise), and the second output gear 104 is rotated in the forward direction. According to the present disclosure, the speed reducing ratio of the differential assembly D may be changed by changing the numbers of teeth of the gears 4 and 5, the numbers of teeth of the eccentric gears 6 and 7, the numbers of teeth of the output eccentric gears 101 and 103, and the numbers of teeth of the output gears 102 and 104. In addition, the rotational directions of the first output gear 102 and the second output gear 104 may be switched by changing the numbers of teeth of the above-mentioned gears.

For these purposes, a cycloid gear may be adopted as the first gear 4, the first eccentric gear 6, the second gear 5, and the second eccentric gear 7, the first output eccentric gear 101, the second output eccentric gear 103, the first output gear 102, and the second output gear 104. For example, in a case of rotating the first output gear 102 in the reverse direction and rotating the second output gear 104 in the forward direction, the number of teeth $z_{1A}$ of the first gear 4, the number of teeth $z_{1B}$ is of the first eccentric gear 6, the number of teeth $z_{2A}$ of the second gear 5, the number of teeth $z_{2B}$ of the second eccentric gear 7, the number of teeth $z_{1C}$ of the first output eccentric gear 101, the number of teeth $z_{2C}$ of the second output eccentric gear 103, the number of teeth $z_{1D}$ of the first output gear 102, and the number of teeth $z_{2D}$ of the second output gear 104 are set such that all of the following relational expressions are satisfied:

$$z_{1A}=z_{1C};$$

$$z_{1B}=z_{1D}=z_{1A}-1;$$

$$z_{2A}=z_{2C}=z_{1A}-3; \text{ and}$$

$$z_{2B}=z_{2D}=z_{2A}+1.$$

In addition, the speed reducing ratio R may be increased to a maximum ratio by reducing a difference between the numbers of teeth of the internal gear (i.e., the first gear 4, the second eccentric gear 7, the first output eccentric gear 101, and the second output gear 104) and the external gear (i.e., the second gear 5 and the first eccentric gear 6, the first output gear 102, and the second output eccentric gear 103) to 1.

Turning to FIG. 6, there is shown the ninth example of the differential assembly D. According to the ninth example, as the eighth example, the differential assembly D is also combined with the prime mover to serve as a power unit 110 having a torque vectoring function.

The prime mover of the power unit 60 includes a drive motor 61 and a brake device 62. Thus, the differential assembly D shown in FIG. 13 is combined with the drive motor assembly having a braking function.

Figure 13:
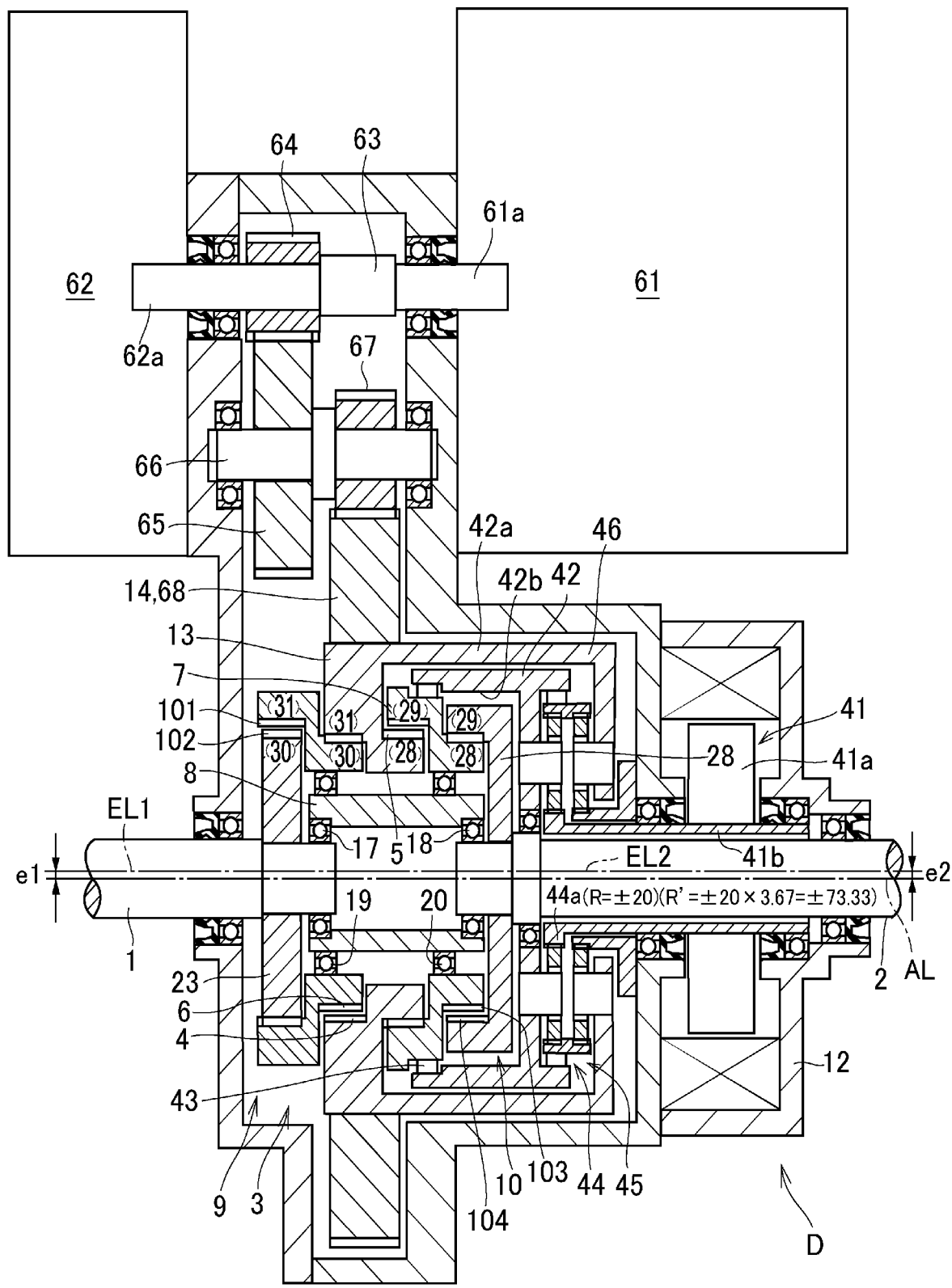
FIG. 13 is a cross-sectional view showing a structure of the differential assembly according a ninth example of the present disclosure.

Thus, according to the ninth example, the differential assembly D shown in FIG. 13 is combined with the drive motor 61 and the brake device 62 to serve as the power unit 110 having the torque vectoring function. Here, it is to be noted that any one of the drive motor 61 and the brake device 62 may be omitted. In this case, the power unit 60 serves as a motor drive unit or a brake unit having a torque vectoring function.

Figure 14:
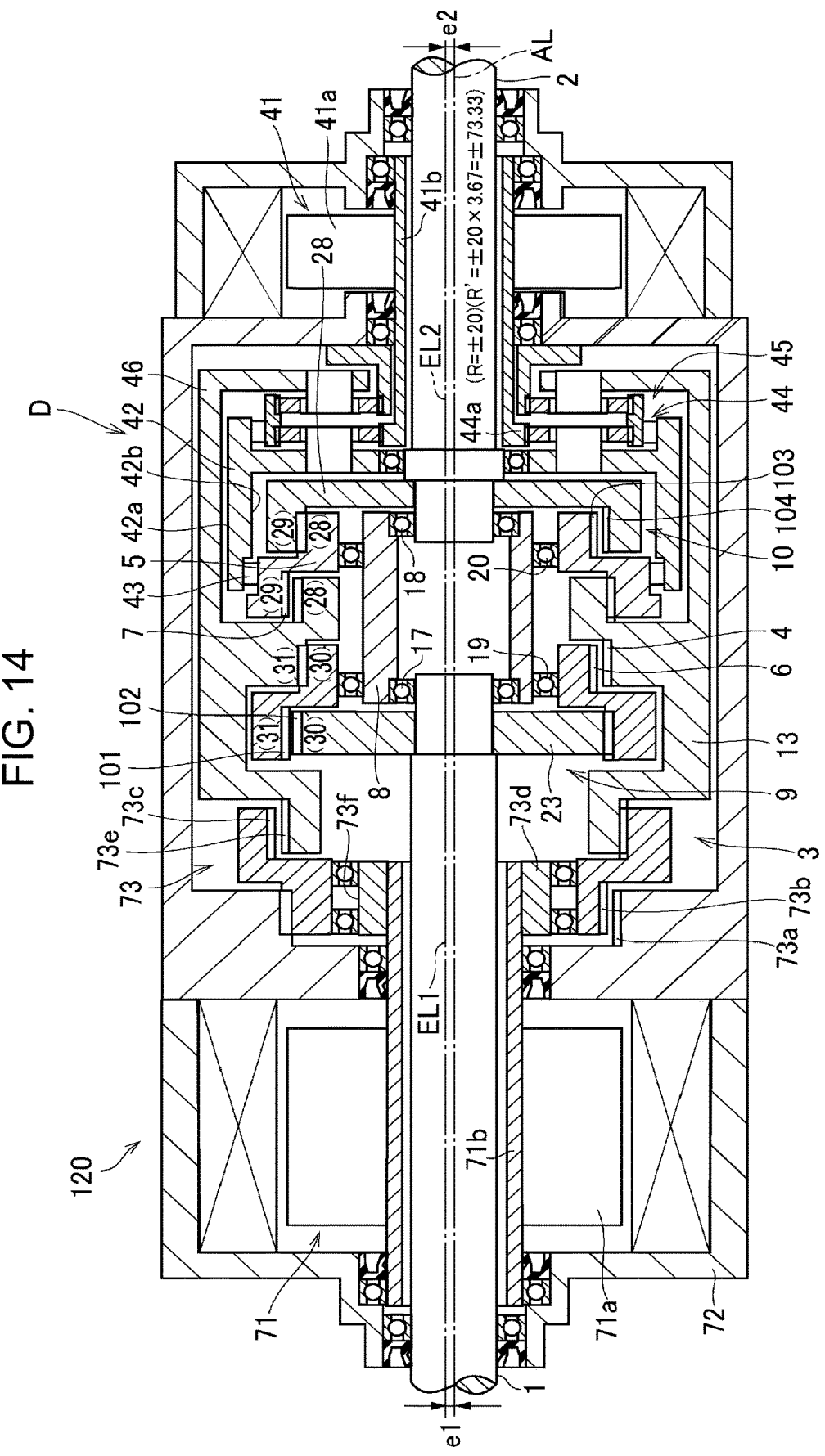
FIG. 14 is a cross-sectional view showing a structure of the differential assembly according a tenth example of the present disclosure.

Turning to FIG. 14, there is shown the tenth example of the differential assembly D. According to the tenth example, the differential assembly D shown in FIG. 14 is adapted to serve as a center differential mechanism 120 that is to be mounted on a four-wheel drive layout vehicle. In the center differential mechanism 120, the first rotary shaft 1 and the second rotary shaft 2 also extend coaxially with each other while being opposed to each other in the longitudinal direction of the vehicle.

As the differential assembly D shown in FIG. 7, the drive motor 71 is also adopted as the prime mover of the differential assembly D shown in FIG. 14. Specifically, the differential assembly D shown in FIG. 14 is arranged coaxially with the drive motor 71 to serve as the center differential mechanism 120. The center differential mechanism 120 may be mounted on a four-wheel drive layout vehicle to serve as a compact power unit having a torque vectoring function.

In the foregoing examples, the case is maintained in a liquid-tight condition by sealing members illustrated in the drawings, and rotary members are supported rotatably by bearings illustrated in the drawings.

Figure 15:
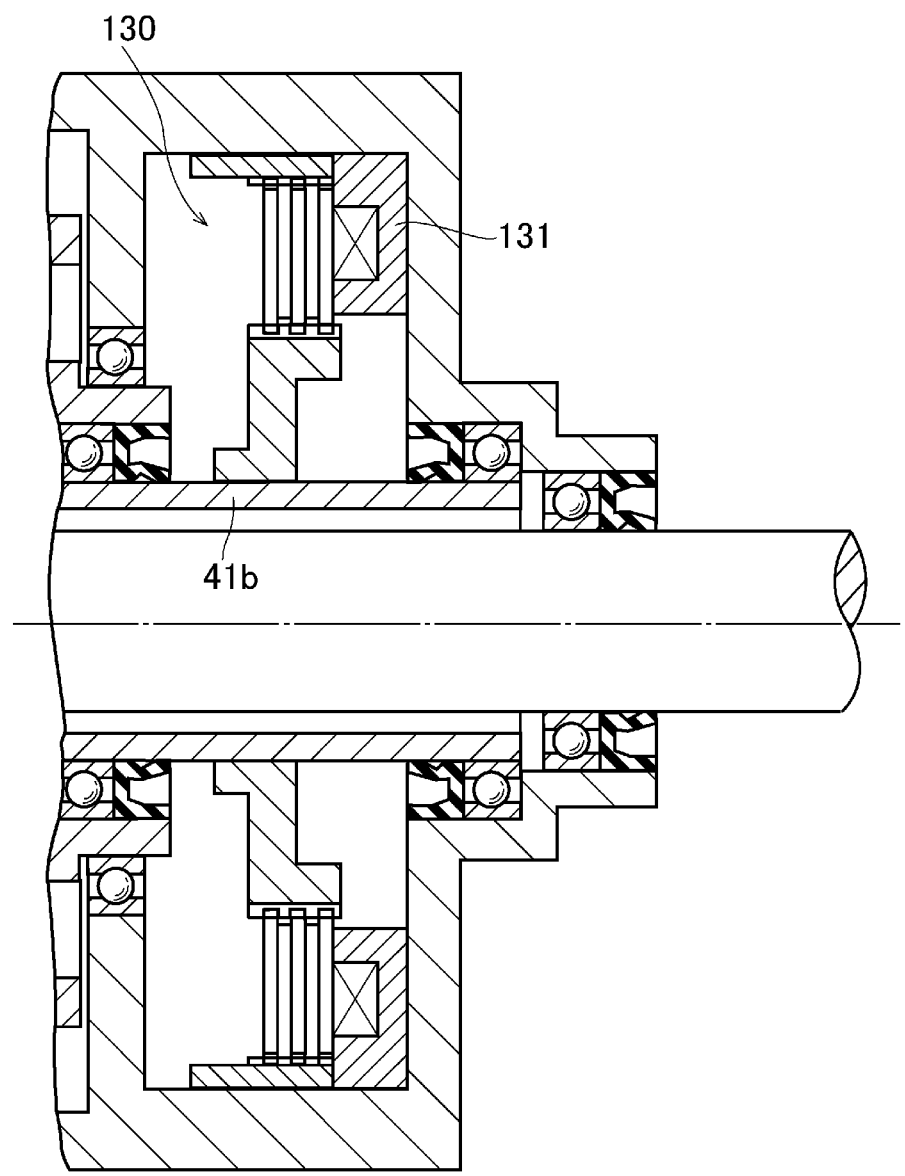
FIG. 15 is a cross-sectional view showing a structure of an electromagnetic brake which may be employed instead of as the control motor.
Figure 16:
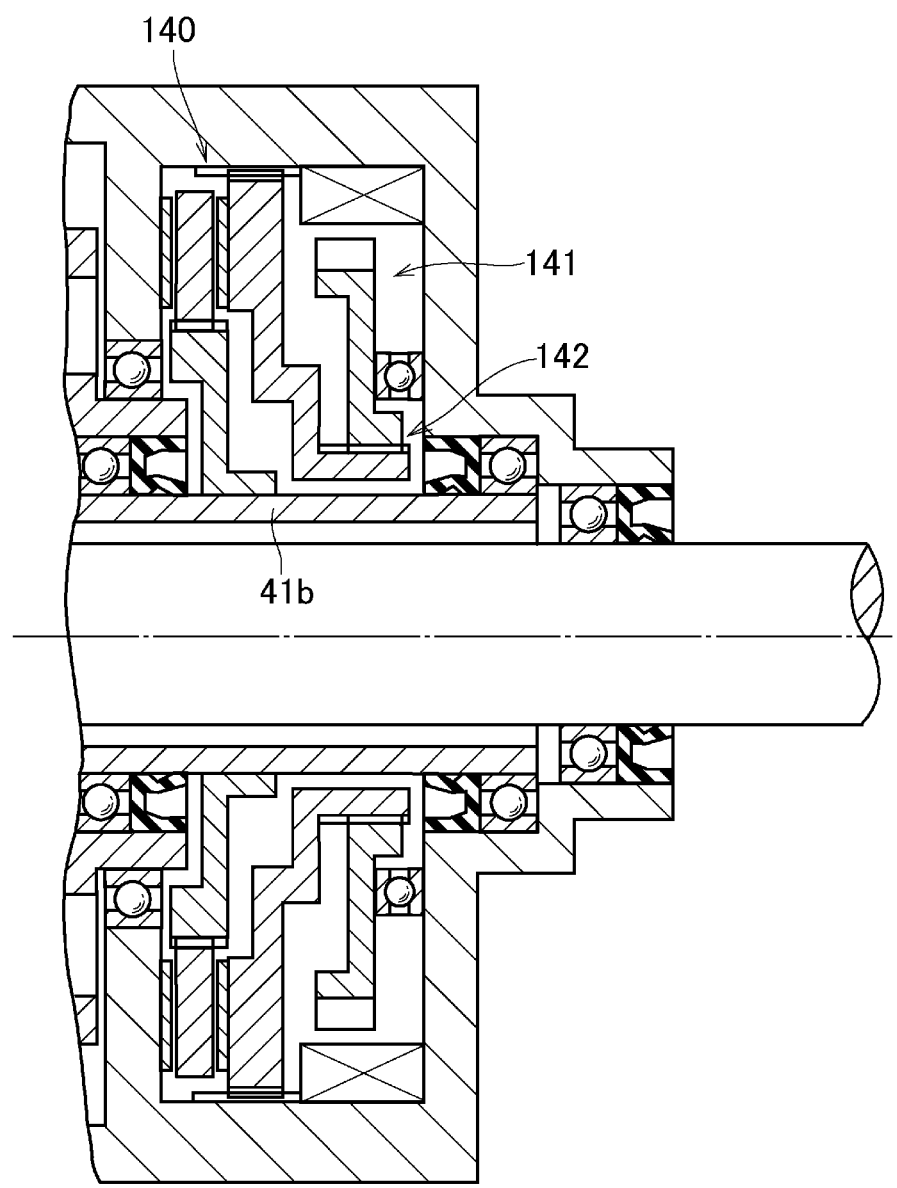
FIG. 16 is a cross-sectional view showing a structure of an electric brake which may be employed instead of as the control motor.

Although the above exemplary embodiment of the present disclosure has been described, it will be understood by those skilled in the art that the present disclosure should not be limited to the described exemplary embodiments, and various changes and modifications can be made within the scope of the present disclosure. As described, a brake device may also be employed instead of the control motor 41 to generate a torque for controlling a rotation of the input element of the differential assembly D such as the supporting carrier 42. For example, an electromagnetic brake 130 shown in FIG. 15 may also be employed instead of the control motor 41. Specifically, the electromagnetic brake 130 is adapted to apply a braking force derived from a magnetic attraction established by energizing a coil 131 to the input element of the differential assembly D. In addition, an electric brake 140 shown in FIG. 16 may also be employed instead of the control motor 41. Specifically, the electric brake 140 is adapted to generate a frictional braking force by actuating a feed-screw mechanism 142 by a motor 141.

What is claimed is:

1. A differential assembly, comprising:
 a first rotary shaft and a second rotary shaft extending coaxially along a common rotational center axis while being allowed to rotate relatively to each other; and
 a differential mechanism that allows the first rotary shaft and the second rotary shaft to rotate at different speeds,
 wherein the differential mechanism comprises
  a first gear that is arranged around the rotational center axis to be rotated relatively to the first rotary shaft,
  a second gear that is arranged around the rotational center axis to be rotated relatively to the second rotary shaft and integrally with the first gear,
  a first eccentric gear that is arranged around a first eccentric axis offset from the rotational center axis while being meshed with the first gear, in such a manner as to rotate around the first eccentric axis and revolve around the rotational center axis,
  a second eccentric gear that is arranged around a second eccentric axis offset from the rotational center axis while being meshed with the second gear, in such a manner as to rotate around the second eccentric axis and revolve around the rotational center axis,
  a supporting member that is arranged around the rotational center axis to support the first eccentric gear and the second eccentric gear in a revolvable manner around the rotational center axis, while being allowed to rotate relatively to the first rotary shaft and the second rotary shaft,
  a first motion translating mechanism that translates a revolving motion of the first eccentric gear into a rotary motion of the first rotary shaft, and translates the rotary motion of the first rotary shaft into the revolving motion of the first eccentric gear, and
  a second motion translating mechanism that translates a revolving motion of the second eccentric gear into a rotary motion of the second rotary shaft, and translates the rotary motion of the second rotary shaft into the revolving motion of the second eccentric gear, and
 the first gear includes an internal gear,
 the first eccentric gear includes an external gear that is meshed with the first gear from radially inner side,
 the second gear includes an external gear,
 the second eccentric gear includes an internal gear that is meshed with the second gear contacted thereto from radially inner side,
 a gear ratio between the first gear and the first eccentric gear and a gear ratio between the second gear and the second eccentric gear are set to different values, and
 the first rotary shaft and the second rotary shaft are rotated in opposite directions when rotated at different speeds.

2. The differential assembly as claimed in claim 1, further comprising:
 a drive input member to which a drive torque is delivered from a prime mover,
 wherein the drive input member is rotated integrally with the first gear and the second gear, and
 the drive input member distributes the torque of the prime mover to the first rotary shaft and the second rotary shaft.

3. The differential assembly as claimed in claim 2, further comprising:
 a control motor that generates a control torque; and
 another supporting member supporting one of the first eccentric gear and the second eccentric gear in a revolvable manner, to which the control torque is delivered from the control motor,
 wherein the another supporting member transmits the control torque to the one of the first eccentric gear and the second eccentric gear such that the one of the first eccentric gear and the second eccentric gear revolves around the rotational center axis,
 the first eccentric gear and the second eccentric gear are rotated in opposite directions in the differential mechanism by applying the control torque to the another supporting member, and
 a distribution ratio of the drive torque to the first rotary shaft and the second rotary shaft is changed by controlling the control torque generated by the control motor.

4. The differential assembly as claimed in claim 3, further comprising:
 a speed increasing planetary gear set comprising a speed increasing sun gear, a speed increasing ring gear, and a speed increasing carrier; and
 a speed reducing planetary gear set comprising a reduction sun gear, a reduction ring gear, and a reduction carrier,
 wherein the speed increasing planetary gear set and the speed reducing planetary gear set are formed around the rotational center axis,
 the speed increasing sun gear is fixed and not allowed to rotate,
 the speed increasing carrier is rotated integrally with the drive input member,
 the speed increasing ring gear is rotated at a higher speed than a rotational speed of the speed increasing carrier,
 the reduction ring gear is connected to the speed increasing ring gear to be rotated integrally with the speed increasing ring gear,
 the reduction carrier is rotated integrally with the another supporting member at a lower speed than a rotational speed of the reduction ring gear, and
 the reduction sun gear is rotated integrally with an output shaft of the control motor, and relatively to the drive input member when the first rotary shaft and the second rotary shaft are rotated passively at a same speed in a same direction together with the drive input member.

5. The differential assembly as claimed in claim 3,
 wherein the differential assembly is mounted on a vehicle having a right wheel and a left wheel together with the prime mover and the control motor,
 the first rotary shaft transmits a torque between one of the wheels and the first eccentric gear, the second rotary shaft transmits a torque between the other one of the wheels and the second eccentric gear, and the first rotary shaft and the second rotary shaft extend coaxially in a width direction of the vehicle.

6. The differential assembly as claimed in claim 3, wherein the differential assembly is mounted on a vehicle having a front wheel and a rear wheel together with the prime mover and the control motor, the first rotary shaft transmits a torque between one of the wheels and the first eccentric gear, the second rotary shaft transmits a torque between the other one of the wheels and the second eccentric gear, and the first rotary shaft and the second rotary shaft extend coaxially in a longitudinal direction of the vehicle.

7. The differential assembly as claimed in claim 2, further comprising:

an engagement device that is selectively engaged to integrally rotate the drive input member and the second eccentric gear, wherein the differential mechanism restricts a differential rotation between the first rotary shaft and the second rotary shaft by engaging the engagement device to rotate the drive input member and the second eccentric gear integrally.

8. The differential assembly as claimed in claim 1, wherein the first motion translating mechanism comprises a first eccentric plate in which the first eccentric gear is formed on its outer circumferential surface, a first plate that is mounted on the first rotary shaft while being opposed to the first eccentric plate in an axial direction to be rotated integrally with the first rotary shaft, a plurality of first reaction holes formed on the first eccentric plate along a pitch circle drawn around the first eccentric axis at regular intervals, and a plurality of first reaction pins attached to the first plate along a pitch circle drawn around the rotational center axis at regular intervals to be inserted loosely into the first reaction holes, the first motion translating mechanism translates a revolving motion of the first eccentric plate around the rotational center axis into a rotary motion of the first plate around the rotational center axis, and translates the rotary motion of the first plate around the rotational center axis into the revolving motion of the first eccentric plate around the rotational center axis, the second motion translating mechanism comprises a second eccentric plate formed integrally with a cylindrical portion in which the second eccentric gear is formed on an inner circumferential surface, a second plate that is mounted on the second rotary shaft while being opposed to the second eccentric plate in the axial direction to be rotated integrally with the second rotary shaft, a plurality of second reaction holes formed on the second eccentric plate along a pitch circle drawn around the second eccentric axis at regular intervals, and a plurality of second reaction pins attached to the second plate along a pitch circle drawn around the rotational center axis at regular intervals to be inserted loosely into the second reaction holes, and the second motion translating mechanism translates a revolving motion of the second eccentric plate around the rotational center axis into a rotary motion of the second plate around the rotational center axis, and translates the rotary motion of the second plate around the rotational center axis into the revolving motion of the second eccentric plate around the rotational center axis.

9. The differential assembly as claimed in claim 8, further comprising:

a dual teeth eccentric member formed around the rotational center axis, that has a hollow portion formed around the first eccentric axis, and wherein the first gear is formed on an inner circumferential surface of the hollow portion, the second gear is formed on an outer circumferential surface of the dual teeth eccentric member, the first eccentric axis and the second eccentric axis are offset from each other, and the first eccentric plate, the second eccentric plate, and the dual teeth eccentric member are overlapped to one another in the axial direction.

10. The differential assembly as claimed in claim 8, wherein a cycloid gear is adopted as the first gear, the first eccentric gear, the second gear, and the second eccentric gear, the number of teeth $z_1$ of the first gear, the number of teeth $z_2$ of the first eccentric gear, the number of teeth $z_3$ of the second gear, and the number of teeth $z_4$ of the second eccentric gear are set such that all of the following relational expressions are satisfied:

$$z_1=z_3;$$

$$z_2=z_1-1; \text{ and}$$

$$z_4=z_1+1.$$

11. The differential assembly as claimed in claim 1, wherein the first motion translating mechanism comprises a first output eccentric gear as an internal gear that is rotated integrally with the first eccentric gear around the first eccentric axis, and a first output gear as an external gear that is rotated integrally with the first rotary shaft while being meshed with the first output eccentric gear from radially inner side, the first motion translating mechanism translates a revolving motion of a unit of the first eccentric gear and the first output eccentric gear around the rotational center axis into a rotary motion of the first output gear around the rotational center axis, and translates the rotary motion of the first output gear around the rotational center axis into the revolving motion of the unit of the first eccentric gear and the first output eccentric gear around the rotational center axis, the second motion translating mechanism comprises a second output eccentric gear as an external gear that is rotated integrally with the second eccentric gear around the second eccentric axis, and a second output gear as an internal gear that is rotated integrally with the second rotary shaft while being meshed with the second output eccentric gear contacted thereto from radially inner side, and the second motion translating mechanism translates a revolving motion of a unit of the second eccentric gear and the second output eccentric gear around the rotational center axis into a rotary motion of the second output gear around the rotational center axis, and translates the rotary motion of the second output gear around the rotational center axis into the revolving motion of the unit of the second eccentric gear and the second output eccentric gear around the rotational center axis.

12. The differential assembly as claimed in claim 11, wherein a cycloid gear is adopted as the first gear, the first eccentric gear, the first output gear, the first output eccentric gear, the second gear, the second eccentric gear, the second output gear, and the second output eccentric gear, and the number of teeth $z_{11}$ of the first gear, the number of teeth $z_{12}$ of the first eccentric gear, the number of teeth $z_{13}$ of the first output gear, the number of teeth $z_{14}$ of the first output eccentric gear, the number of teeth $z_{21}$ of the second gear, the number of teeth $z_{22}$ of the second eccentric gear, the number of teeth $z_{23}$ of the second output gear, and the number of teeth $z_{24}$ of the second output eccentric gear are set such that all of the following relational expressions are satisfied:

$$z_{11} = z_{14};$$

$$z_{12} = z_{13} = z_{11} - 1;$$

$$z_{21} = z_{24} = z_{11} - 3; \text{ and}$$

$$z_{22} = z_{23} = z_{21} + 1.$$

* * * * *